(12) United States Patent
Cheng et al.

(10) Patent No.: US 11,580,920 B2
(45) Date of Patent: Feb. 14, 2023

(54) SYNCHRONIZED DRIVING WAVEFORMS FOR FOUR-PARTICLE ELECTROPHORETIC DISPLAYS

(71) Applicant: E Ink California, LLC, Fremont, CA (US)

(72) Inventors: Chih-Yu Cheng, Taipei (TW); Craig Lin, Fremont, CA (US); Ning-Wei Jan, New Taipei (TW); Chen-Kai Chiu, Taoyuan (TW); Feng-Shou Lin, Tainan (TW)

(73) Assignee: E Ink California, LLC, Fremont, CA (US)

( * ) Notice: Subject to any disclaimer, the term of this patent is extended or adjusted under 35 U.S.C. 154(b) by 0 days.

(21) Appl. No.: 17/751,946

(22) Filed: May 24, 2022

(65) Prior Publication Data
US 2022/0383828 A1    Dec. 1, 2022

Related U.S. Application Data

(60) Provisional application No. 63/192,905, filed on May 25, 2021.

(51) Int. Cl.
*G09G 3/34*    (2006.01)
(52) U.S. Cl.
CPC ..... *G09G 3/3446* (2013.01); *G09G 2310/068* (2013.01)
(58) Field of Classification Search
CPC .............. G09G 3/3446; G09G 2310/068
See application file for complete search history.

(56) References Cited

U.S. PATENT DOCUMENTS

| | | | |
|---|---|---|---|
| 6,241,921 B1 | 6/2001 | Jacobson et al. |
| 6,672,921 B1 | 1/2004 | Liang et al. |
| 6,788,449 B2 | 9/2004 | Liang et al. |
| 6,866,760 B2 | 3/2005 | Paolini, Jr. et al. |
| 6,922,276 B2 | 7/2005 | Zhang et al. |
| 6,930,818 B1 | 8/2005 | Liang et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,046,228 B2 | 5/2006 | Liang et al. |
| 7,072,095 B2 | 7/2006 | Liang et al. |
| 7,075,502 B1 | 7/2006 | Drzaic et al. |
| 7,110,163 B2 | 9/2006 | Webber et al. |
| 7,116,318 B2 | 10/2006 | Amundson et al. |

(Continued)

OTHER PUBLICATIONS

Korean Intellectual Property Office, "International Search Report and Written Opinion", PCT/US2022/030730, dated Aug. 24, 2022. dated Aug. 24, 2022.

*Primary Examiner* — Priyank J Shah
(74) *Attorney, Agent, or Firm* — Brian D. Bean

(57) ABSTRACT

The present invention provides improved driving methods for four particle electrophoretic displays. The driving methods improve the color state performance when a first pixel is displaying a mixed state of a first highly-charged particle and a second lower-charged particle of the opposite polarity, while a neighboring pixel is displaying a state of a second highly-charged particle having the opposite polarity to the first highly-charged particle. The particles can be, for example, all reflective or one type of particle can be partially light transmissive.

9 Claims, 30 Drawing Sheets
(23 of 30 Drawing Sheet(s) Filed in Color)

(56) References Cited

U.S. PATENT DOCUMENTS

| | | |
|---|---|---|
| 7,144,942 B2 | 12/2006 | Zang et al. |
| 7,312,784 B2 | 12/2007 | Baucom et al. |
| 7,388,572 B2 | 6/2008 | Duthaler et al. |
| 7,411,719 B2 | 8/2008 | Paolini, Jr. et al. |
| 7,453,445 B2 | 11/2008 | Amundson |
| 7,535,624 B2 | 5/2009 | Amundson et al. |
| 7,679,814 B2 | 3/2010 | Paolini, Jr. et al. |
| 7,715,088 B2 | 5/2010 | Liang et al. |
| 7,839,564 B2 | 11/2010 | Whitesides et al. |
| 8,009,348 B2 | 8/2011 | Zehner et al. |
| 8,558,855 B2 | 10/2013 | Sprague et al. |
| 9,170,468 B2 | 10/2015 | Lin et al. |
| 9,279,906 B2 | 3/2016 | Kang |
| 9,459,510 B2 | 10/2016 | Lin |
| 9,640,119 B2 | 5/2017 | Lin et al. |
| 9,812,073 B2 | 11/2017 | Lin et al. |
| 10,147,366 B2 | 12/2018 | Lin et al. |
| 10,444,553 B2 | 10/2019 | Laxton |
| 10,586,499 B2 | 3/2020 | Lin |
| 10,613,407 B2 | 4/2020 | Lin et al. |
| 2001/0030639 A1* | 10/2001 | Goden .................... G02F 1/167 345/107 |
| 2009/0322721 A1 | 12/2009 | Zehner et al. |
| 2011/0181533 A1 | 7/2011 | Pan et al. |
| 2014/0011913 A1 | 1/2014 | Du et al. |
| 2015/0005720 A1 | 1/2015 | Zang et al. |
| 2016/0012710 A1 | 1/2016 | Lu et al. |
| 2017/0148395 A1* | 5/2017 | Chan .................... G09G 3/2003 |
| 2020/0184906 A1 | 6/2020 | Lin |
| 2021/0382369 A1 | 12/2021 | Zheng et al. |

\* cited by examiner

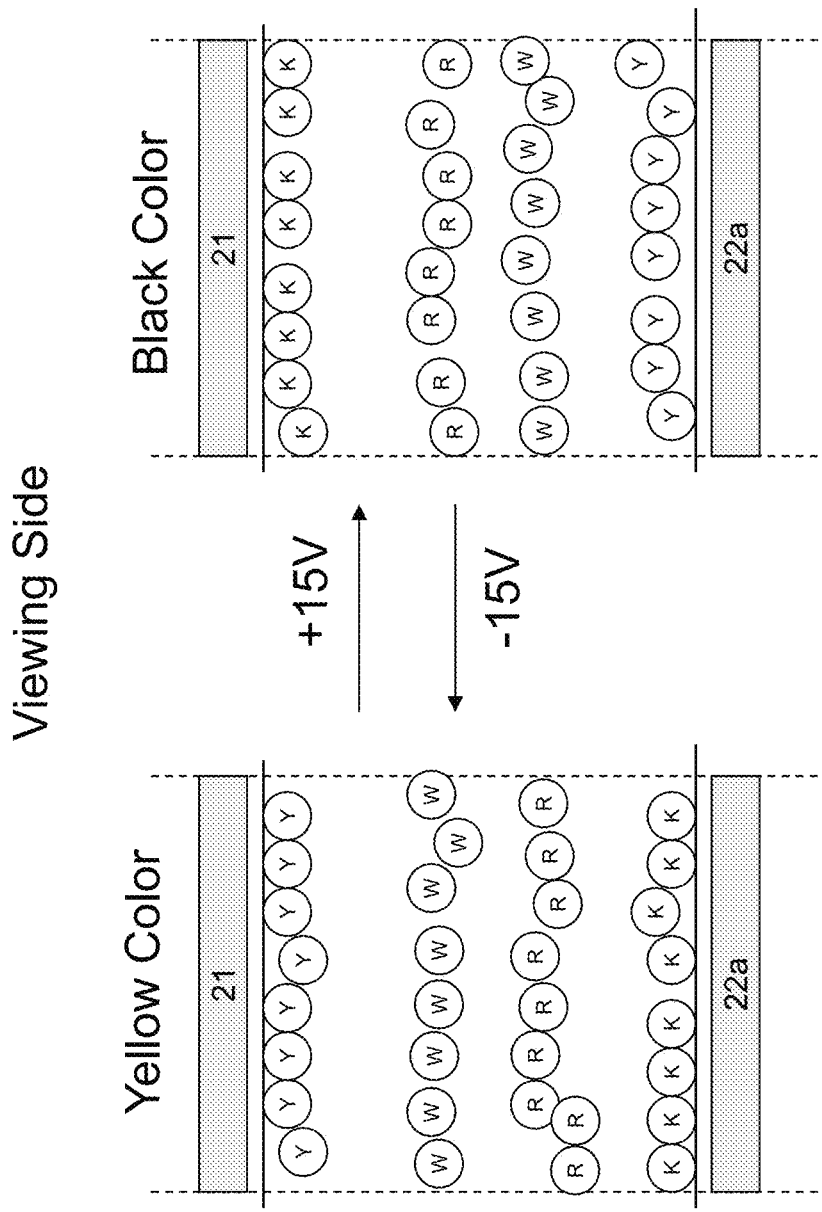

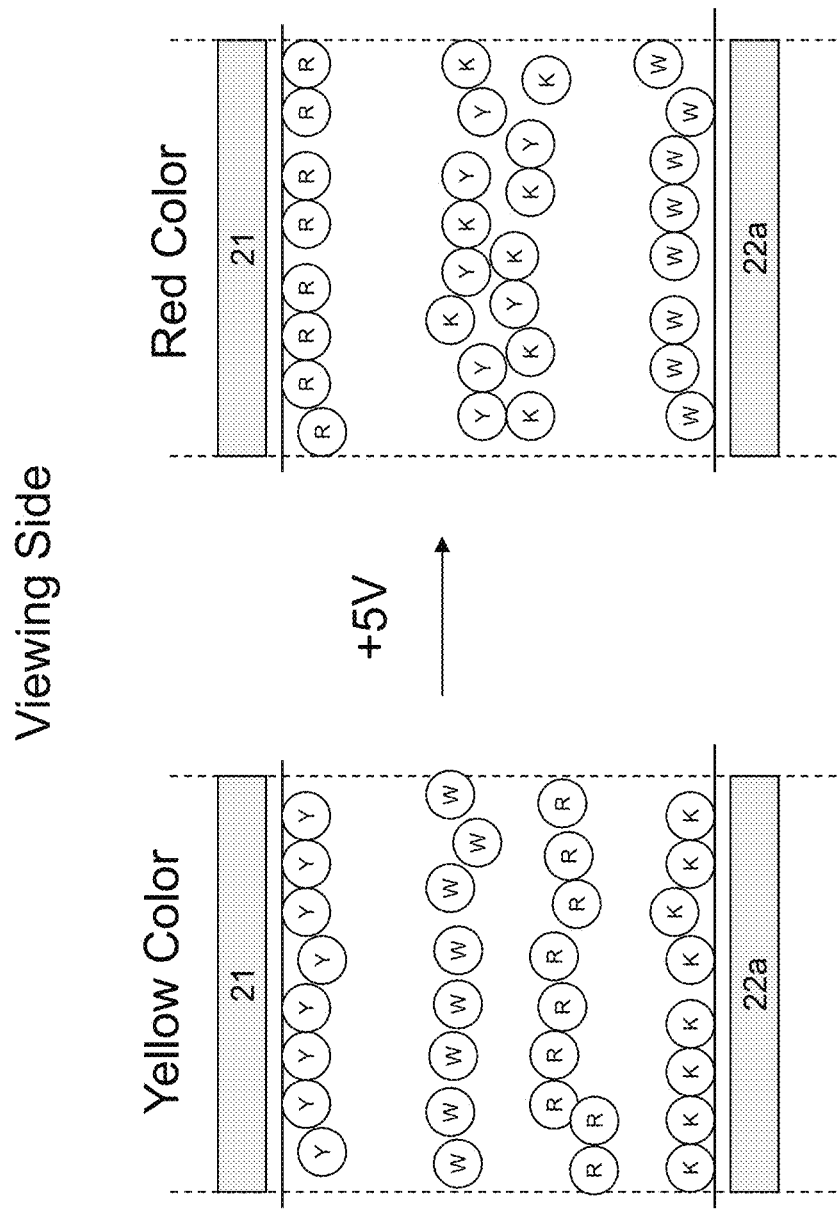

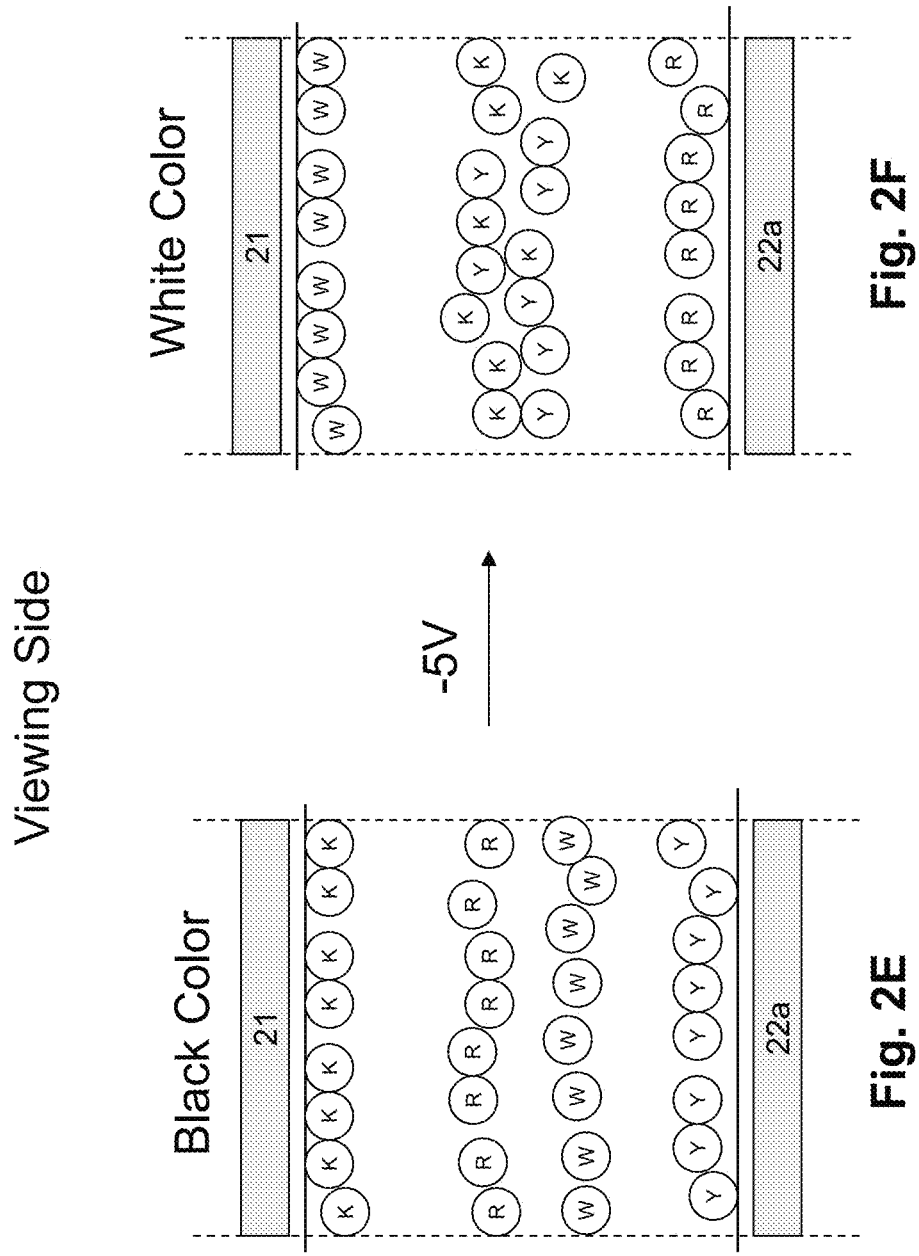

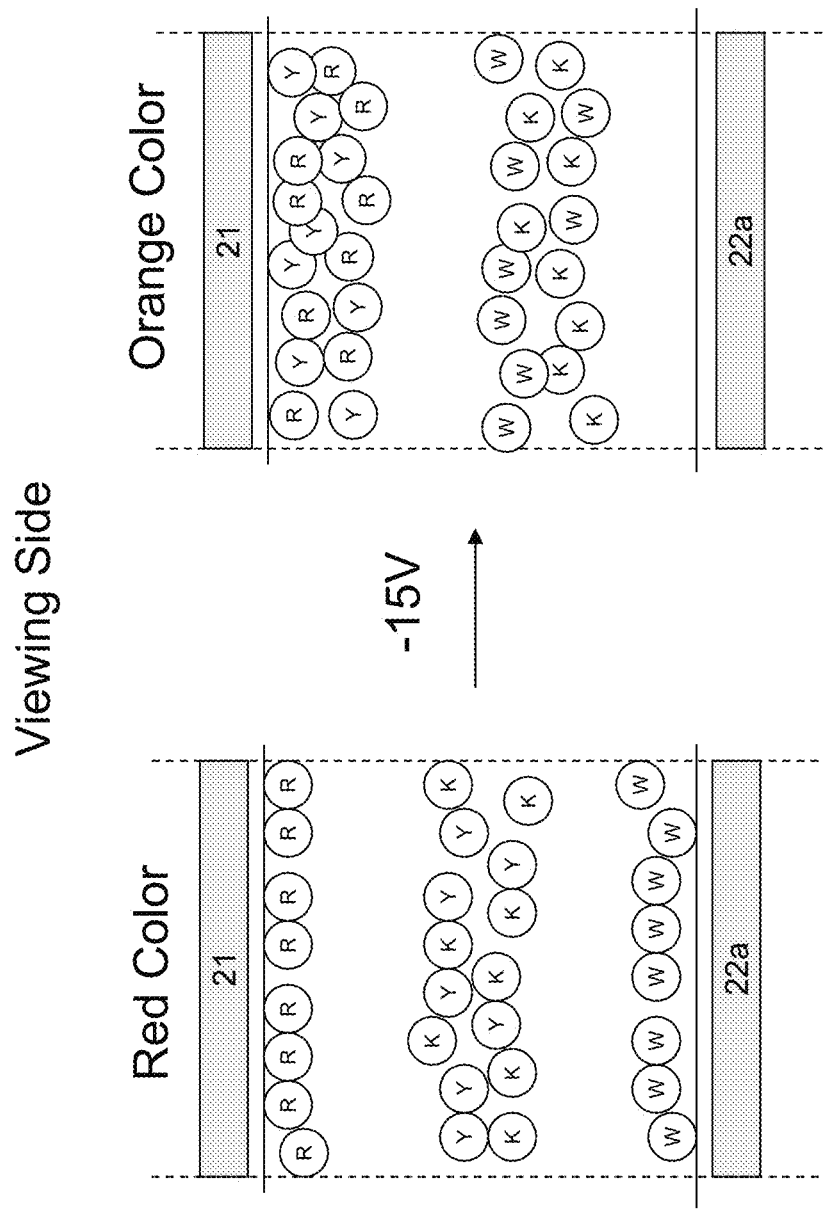

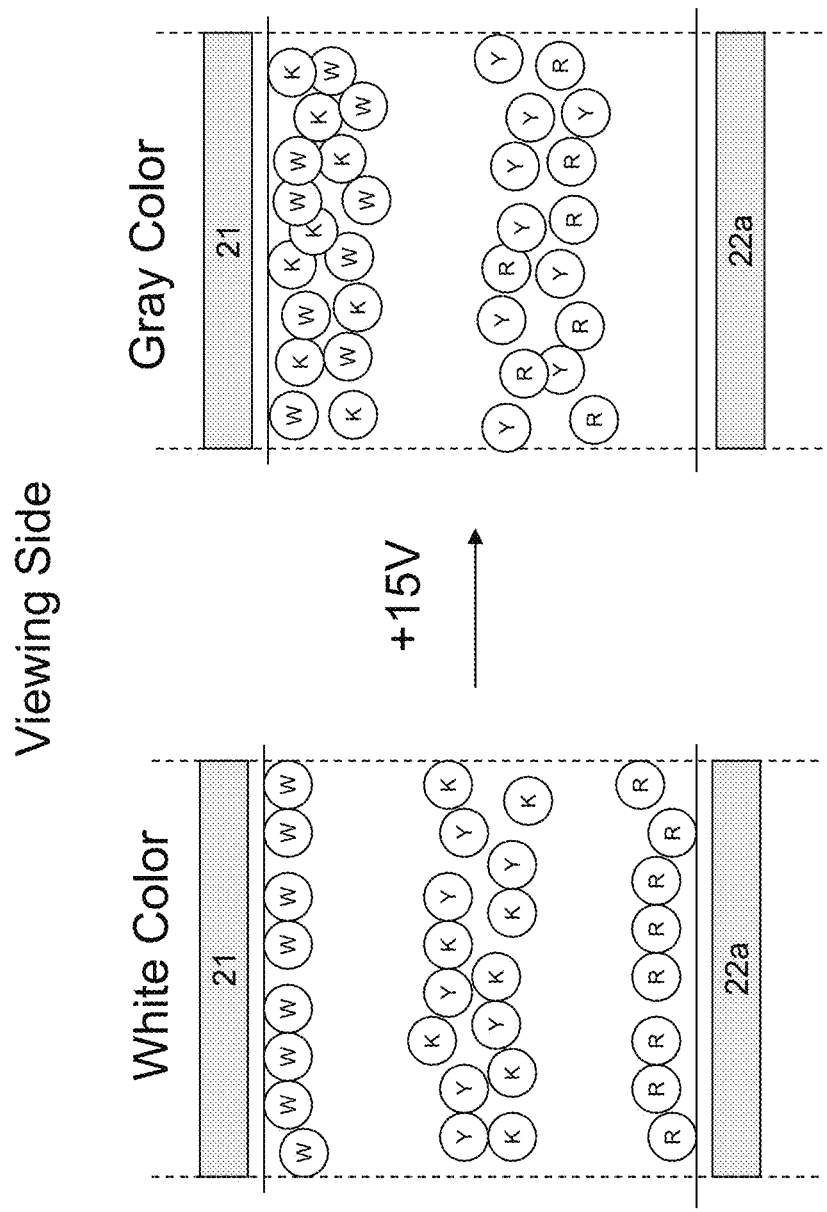

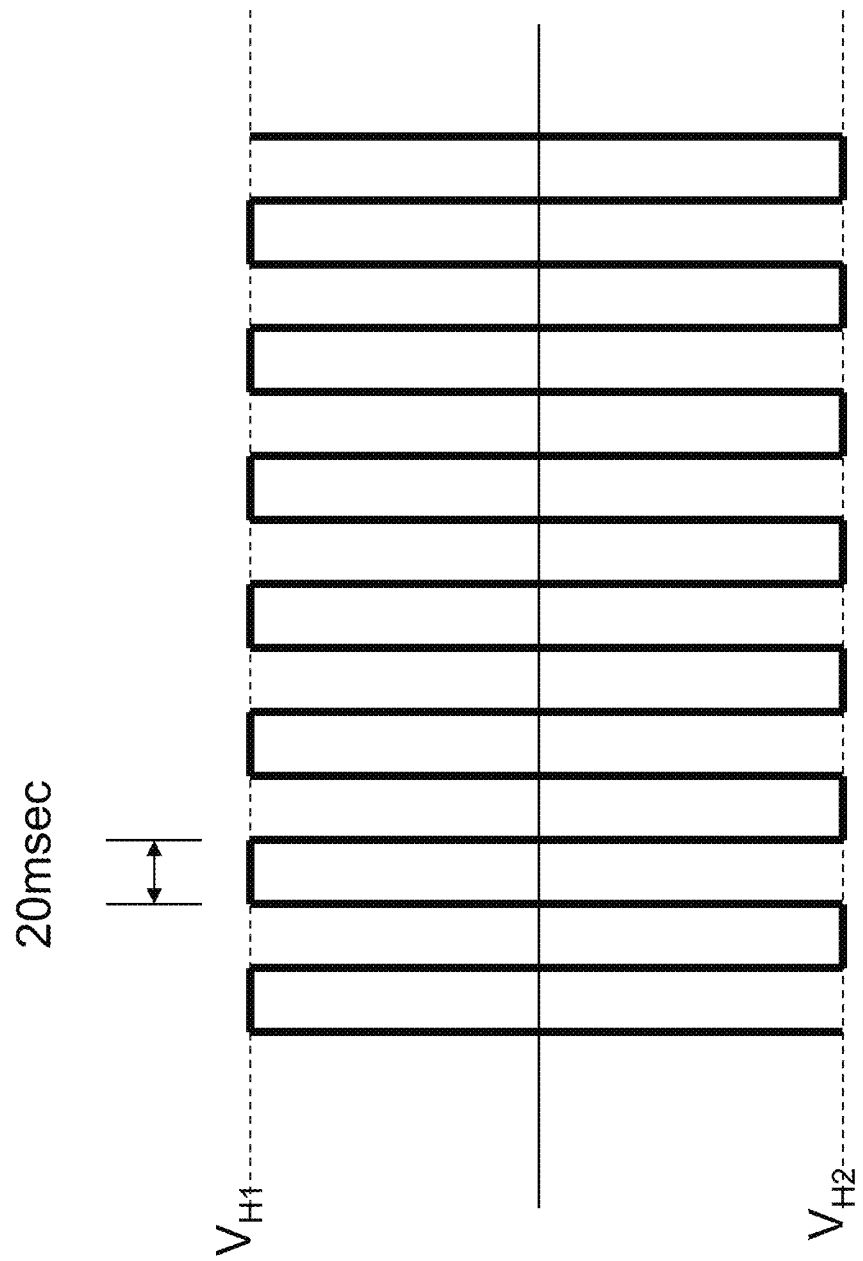

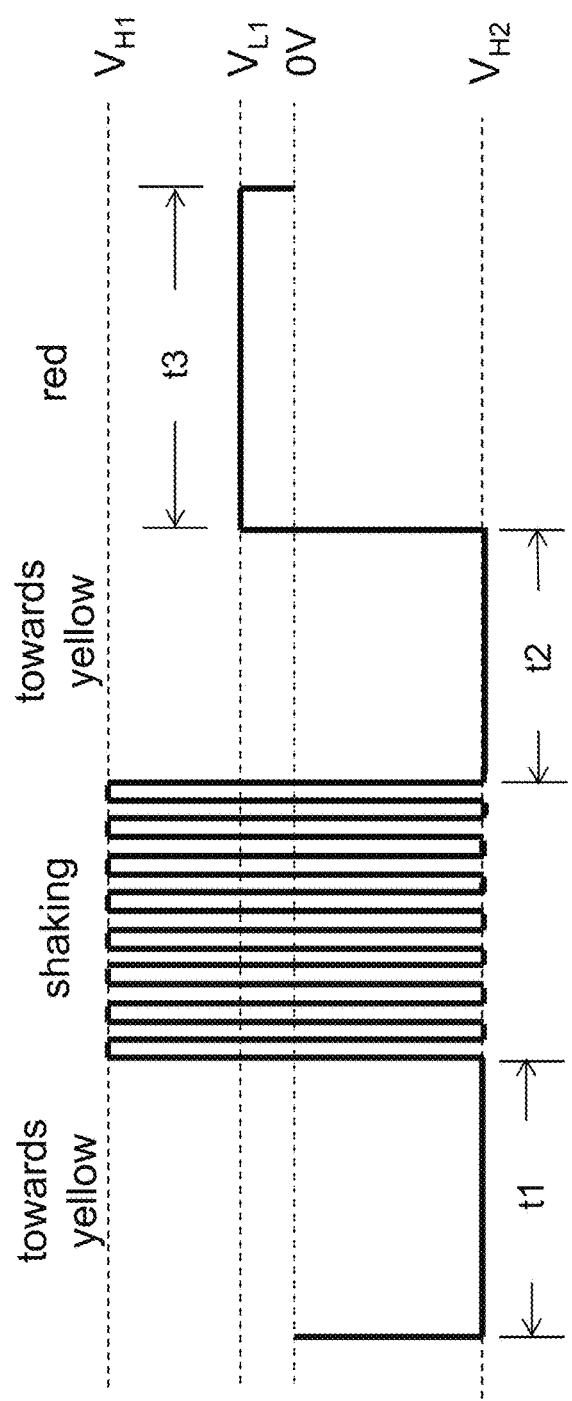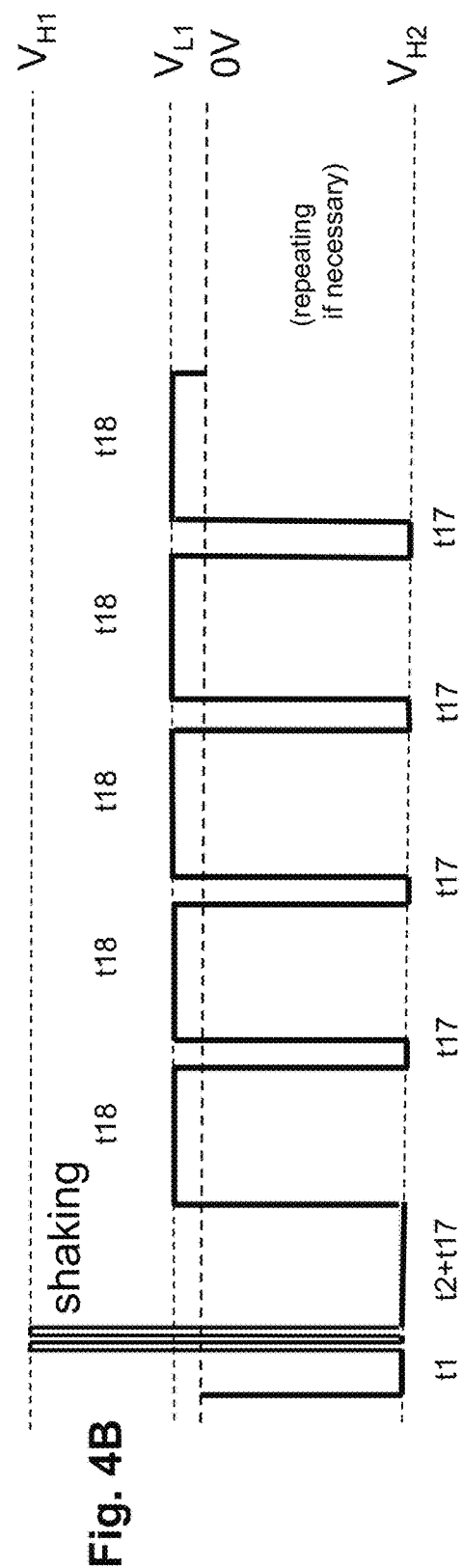

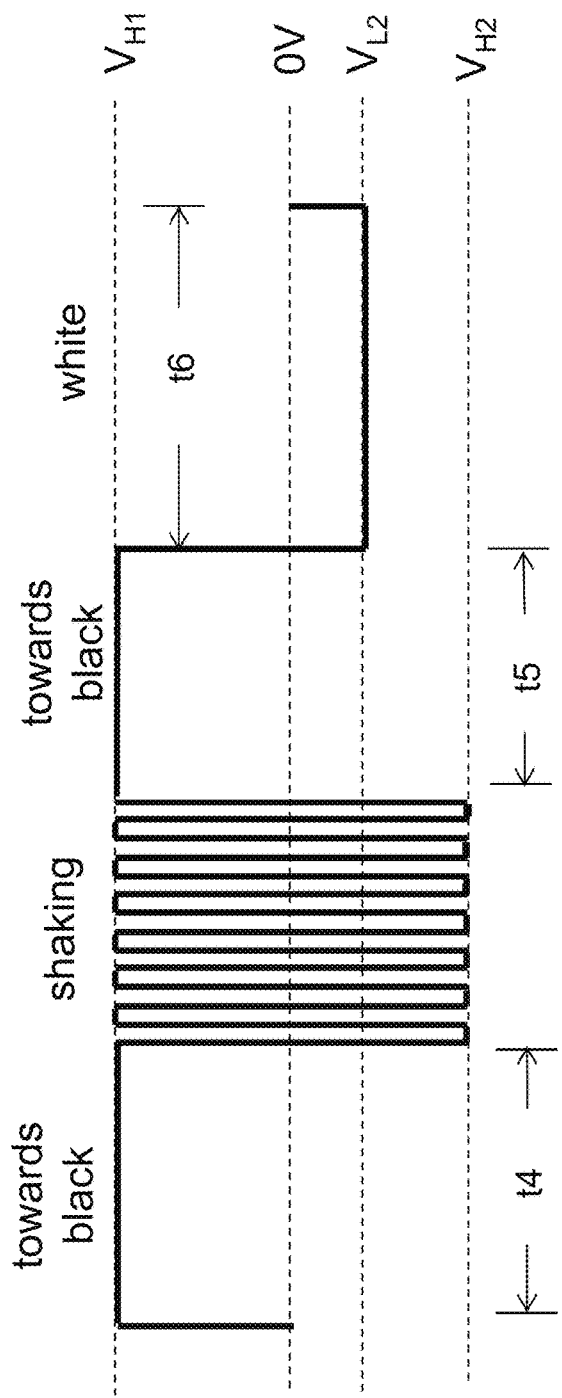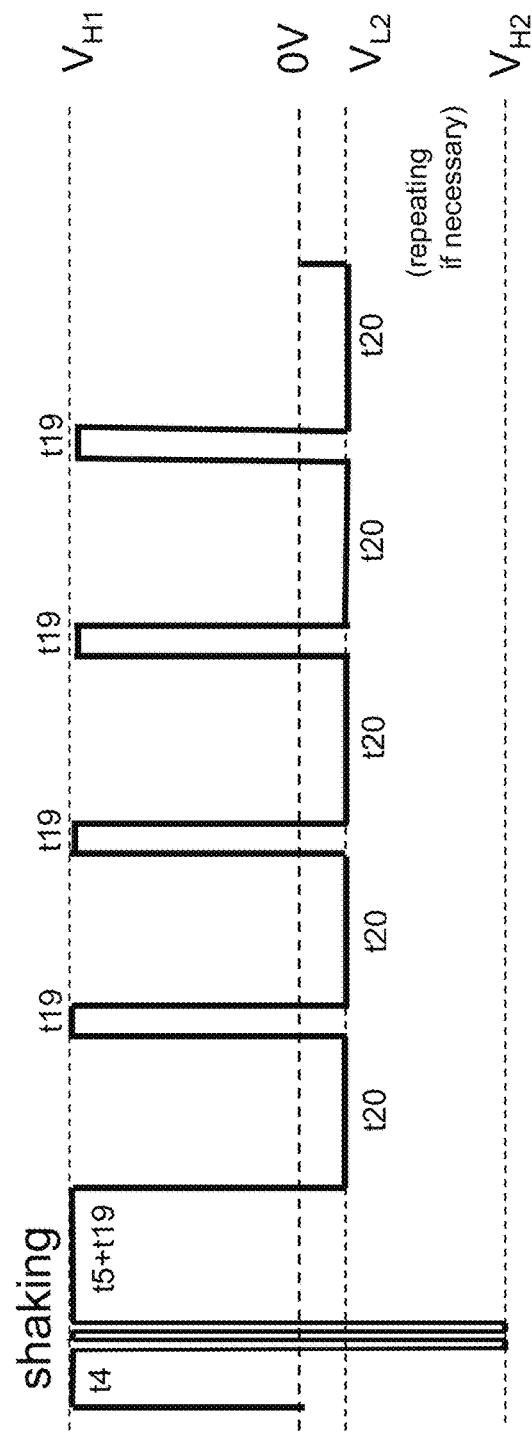

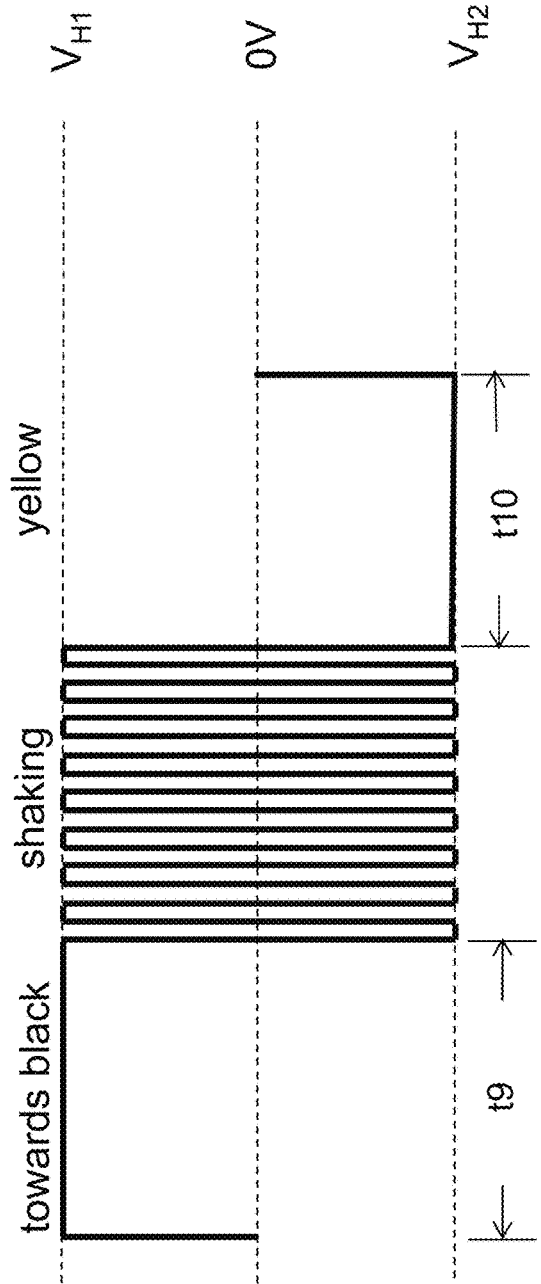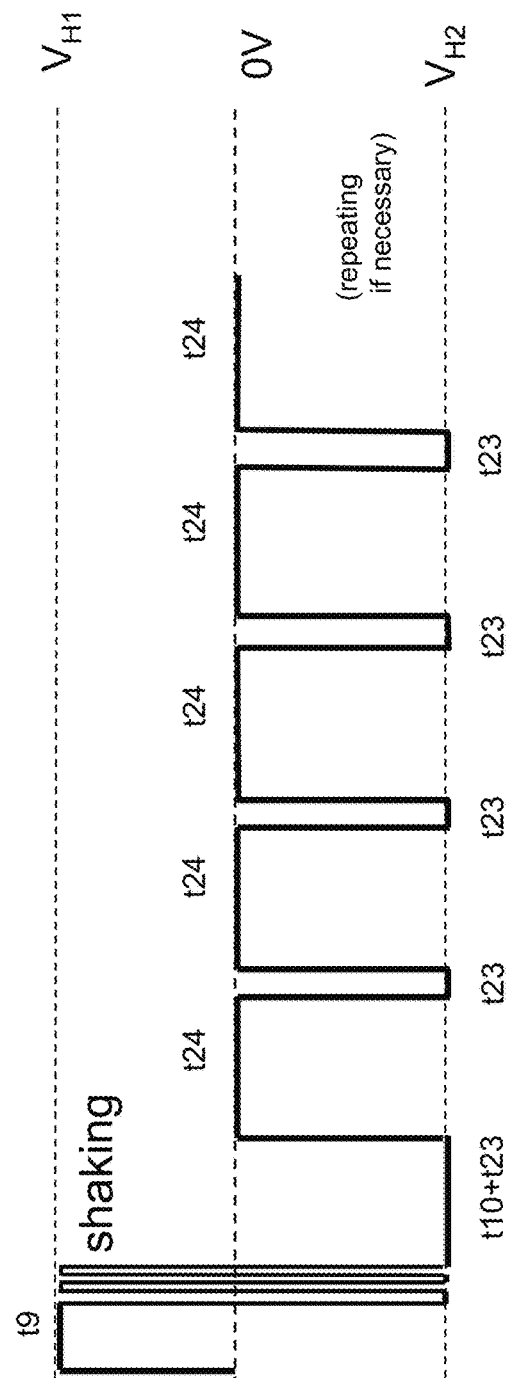

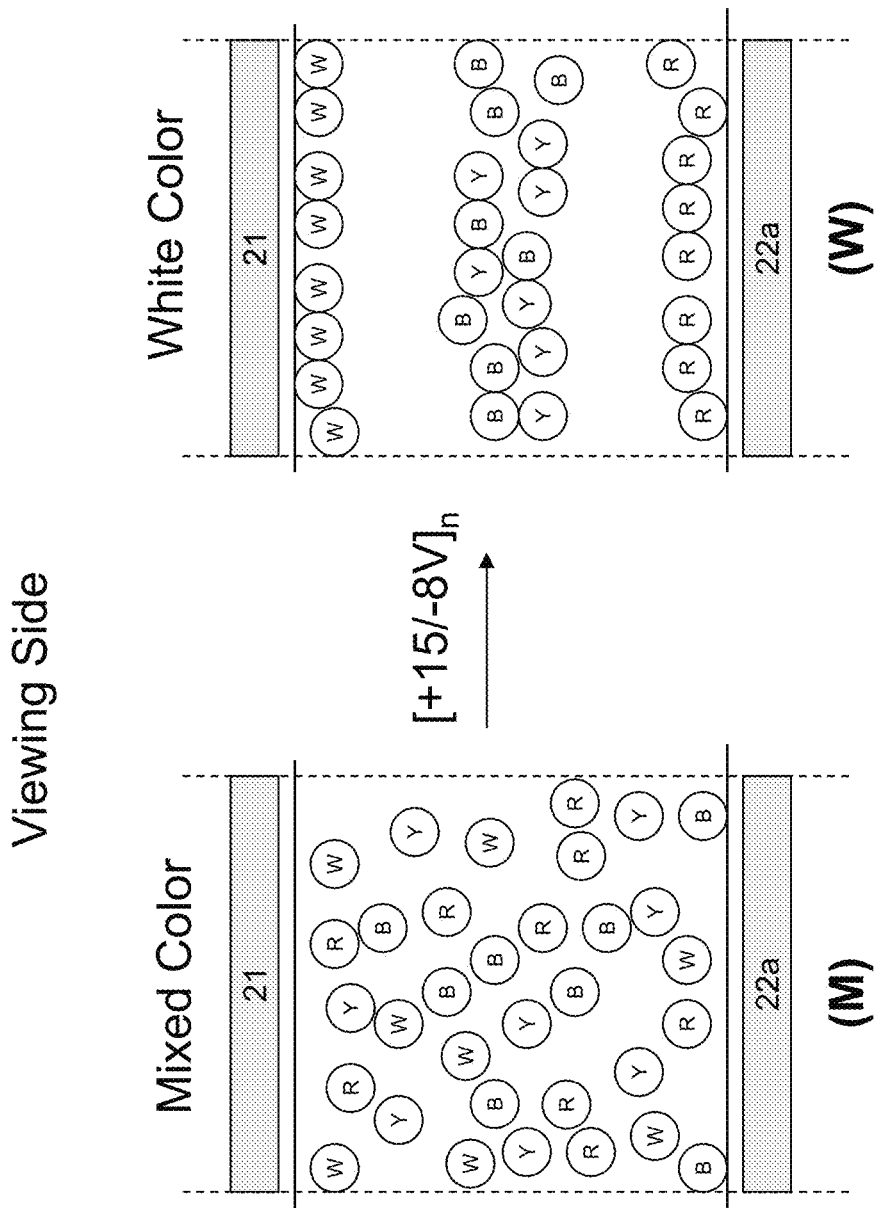

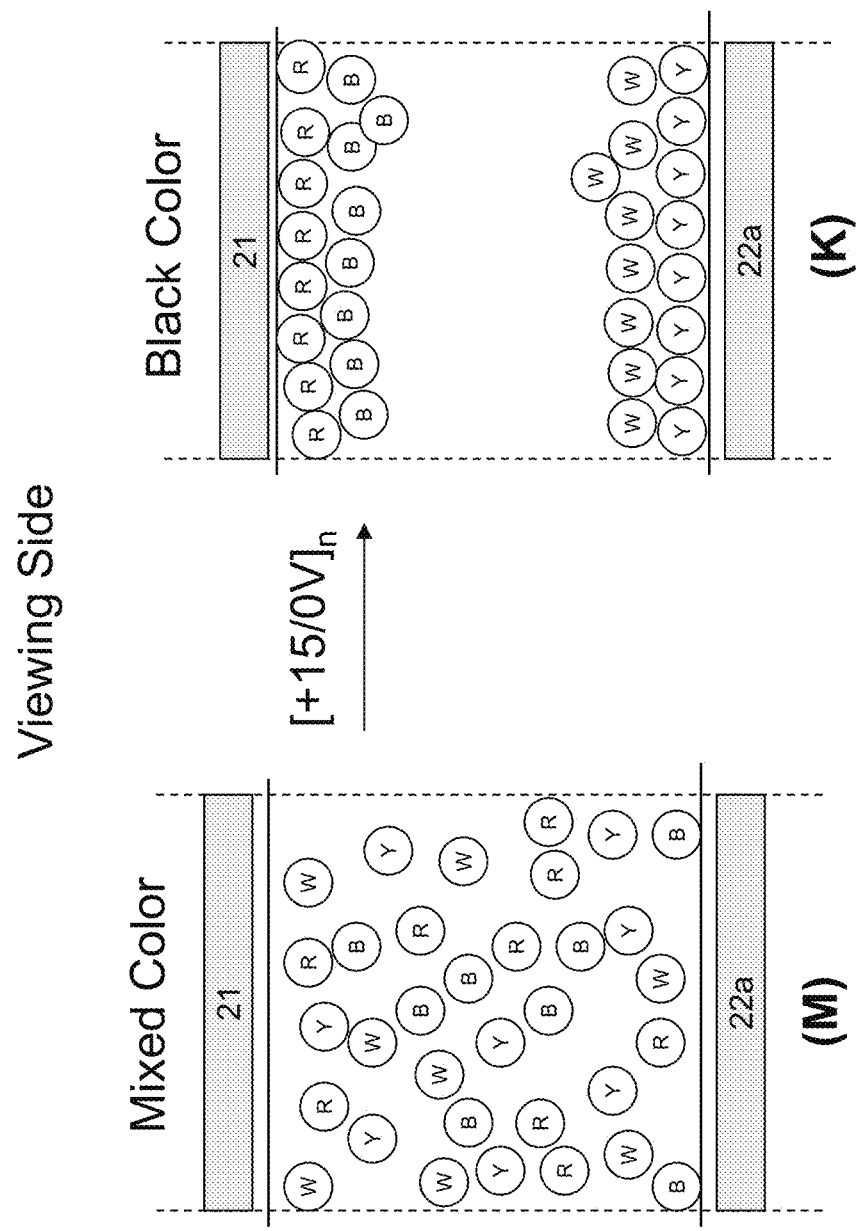

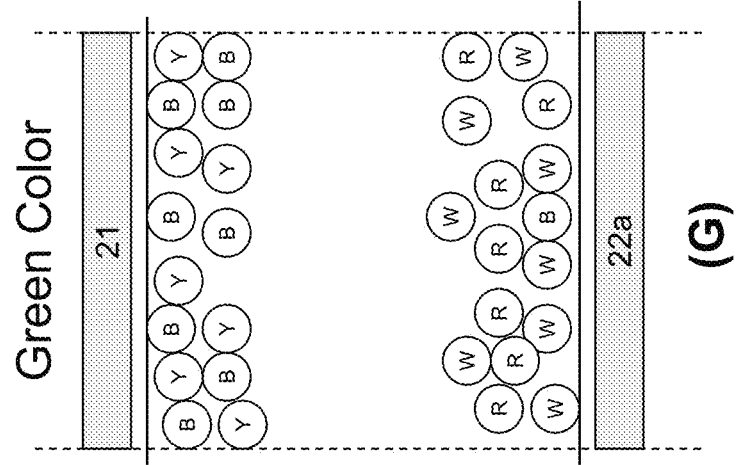
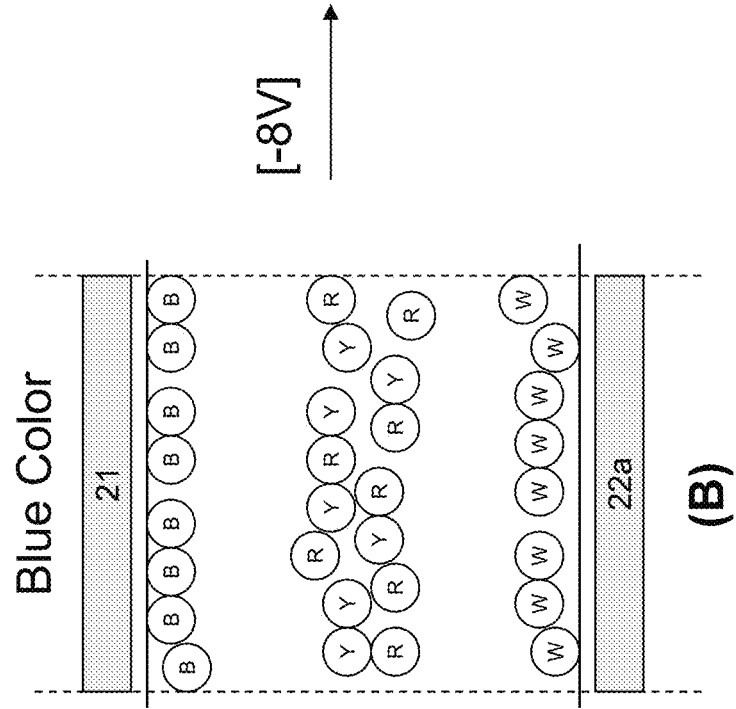
Figure 17F

SYNCHRONIZED DRIVING WAVEFORMS FOR FOUR-PARTICLE ELECTROPHORETIC DISPLAYS

REFERENCE TO RELATED APPLICATIONS

This application claims priority to U.S. Provisional Patent Application No. 63/192,905, filed May 25, 2021. The entire contents of all patents and publications mentioned below are herein incorporated by reference in their entireties.

FIELD OF THE INVENTION

The present invention is directed to improved driving methods for a color electrophoretic display device in which each pixel can display at least four high-quality color states.

BACKGROUND OF THE INVENTION

Electrophoretic displays (electronic paper, ePaper, etc.), such as commercially-available from E Ink Holdings (Hsinchu, Taiwan), have advantages of being light, durable, and eco-friendly because they consume very little power. The technology has been incorporated into electronic readers (e.g., electronic book, eBook) and other display environments (e.g., phones, tablets, electronic shelf tags, hospital signage, road signs, mass transit time tables). The combination of low power consumption and sunlight readability has allowed for rapid growth in so called "no-plug and play" operations in which a digital signage system is merely attached to a surface and interfaces with exiting communication networks to provide regular updates of information or images. Because the display is powered with a battery or solar collector, there is no need to run utilities or even have a plug dangling from the display.

A variety of color options for electrophoretic displays have recently become available, ranging from improved color filter arrays, to complex subtractive pigment sets, to high-fidelity color options that rely on multiple sets of reflective color particles. This last system has seen great acceptance for commercial signage, such as in food stores, clothiers, and electronics retailers. In particular, three particle E Ink SPECTRA™ signs can be found around the world in grocery stores, consumer electronics retailers, and home improvement stores. Upcoming improvements will include a fourth reflected electrophoretic particle, e.g., as described in U.S. Pat. Nos. 9,170,468, 9,812,073, 9,640,119, and 10,147,366, all of which are incorporated by reference in their entities. The four-particle systems typically include black, white, red, and yellow particles, however a variety of colors are possible depending upon the selection of engineered pigments. Additionally, as described in U.S. Pat. No. 9,640,119, it is also possible to present a mixture of two of the four types of particles at the viewing surface, to achieve, for example, the color orange as a mixture of red and yellow particles at the viewing surface. The invention provides driving waveform improvements for such systems, especially when implemented in a display having an array of pixel electrodes.

SUMMARY OF THE INVENTION

The invention provides an improved method for driving adjacent pixels in an electrophoretic display having four types of colored particles. In particular, by coordinating the high voltage pulses to arrive at approximately the same frame, the color change due to blooming is substantially reduced. Additionally, by trimming the high voltage pulses used to address the highly-charged particle states, there is less color drift in the mixed state pixels and improved color fidelity in the final image. In one aspect, a method of driving a display layer disposed between a viewing surface including a light-transmissive electrode and a second surface on the opposed side of the display layer from the viewing surface, the second surface including a first driving electrode and a second driving electrode, the display layer including an electrophoretic medium comprising a fluid and first, second, third and fourth types of particles dispersed in the fluid, wherein the first, second, third and fourth types of particles have respectively first, second, third, and fourth optical characteristics differing from one another, the first and third types of particles having charges of a first polarity and the second and fourth types of particles having charges of a second polarity, opposite the first polarity, and the first and third types of particles do not have the same charge magnitudes, and the second and fourth types of particles do not have the same charge magnitudes. The method comprising the following steps: applying a first electric field having a high magnitude and the first polarity to the first drive electrode for a first time period to drive the first type of particles towards the viewing surface, thereby causing the display layer to display the first optical characteristic at the viewing surface above the first drive electrode, applying a second electric field having the high magnitude and the second polarity to the second drive electrode for a second time period to drive the second type of particles toward the viewing surface, thereby causing the display layer to display the second optical characteristic at the viewing surface above the second drive electrode, wherein the first electric field is applied to the first drive electrode simultaneously while the second electric field is applied to the second drive electrode, applying no electric field to the first drive electrode for a third period following the first period, applying a third electric field having a low magnitude and the first polarity to the second drive electrode for a fourth time period overlapping with the third time period to drive the third type of particles toward the viewing surface, thereby causing the display layer to display the third optical characteristic at the viewing surface above the second drive electrode, repeating the previous steps, and applying a fourth electric field having the same magnitude and polarity as step (ii) to the second drive electrode for a fifth time period, thereby causing the display layer to display a mixture of the second and third optical characteristics at the viewing surface above the second drive electrode while displaying the first optical characteristic at the viewing surface above the first drive electrode. In one embodiment, the first time period is shorter than the third time period. In one embodiment, the second time period is shorter than the fourth time period. In one embodiment, the fifth time period is longer than the first time period and shorter than the third time period. In one embodiment, the magnitude of the third electric field is less than 50 percent of the magnitude of the second electric field. In one embodiment, the first and third types of particles are negatively charged and the second and fourth types of particles are positively charged. In one embodiment, the first type of particle is yellow, the second type of particle is black, the third type of particle is white, and the fourth type of particle is red. In one embodiment, the first type of particle is light transmissive, the second type of particle is yellow, the fourth type of particle is white, and the first and third types of particles are red and blue (in either order).

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 2A-2J are schematic cross-sections similar to those of FIG. 1 but illustrating changes in particle positions as a result of applying driving sequences of particular charge and polarity.

FIG. 3 shows a generic "shaking" waveform which may be used in the driving methods of the invention. When used with an active matrix display, the time width of each cycle (+HV to −HV) is at least two times the frame time for that display. However, there is no physical limitation to driving the electrophoretic medium, and the time width of each cycle may be shorter or longer than typical with an active matrix display.

FIG. 4A illustrates a basic red driving waveform for a four particle electrophoretic display.

FIG. 4B illustrates a commercial implementation of a red waveform, which includes a string of repeating pulses. The repeating pulses improve the separation of the red particles from the other particles in the medium, resulting in a more saturated red optical state at the viewing surface.

FIG. 5A illustrates a basic white driving waveform for a four particle electrophoretic display.

FIG. 5B illustrates a commercial implementation of a white waveform, which includes a string of repeating pulses. The repeating pulses improve the separation of the white particles from the other particles in the medium, resulting in a more saturated white optical state at the viewing surface.

FIG. 7A illustrates a basic yellow driving waveform for a four particle electrophoretic display.

FIG. 7B illustrates a commercial implementation of a yellow waveform, which includes a string of repeating pulses. The repeating pulses improve the separation of the yellow particles from the other particles in the medium, resulting in a more saturated yellow optical state at the viewing surface.

FIG. 10 does not account for the difference in electric fields due to neighboring pixels being addressed to different optical states.

FIGS. 16A-16F are schematic cross-sections similar to those of FIGS. 2A-2J but showing various optical transitions in a display device using a blue partially-light-transmissive particle.

FIGS. 17A-17F are schematic cross-sections similar to those of FIGS. 2A-2J but showing various optical transitions in a display device using a red partially-light-transmissive particle.

DETAILED DESCRIPTION OF THE INVENTION

Figure 1:
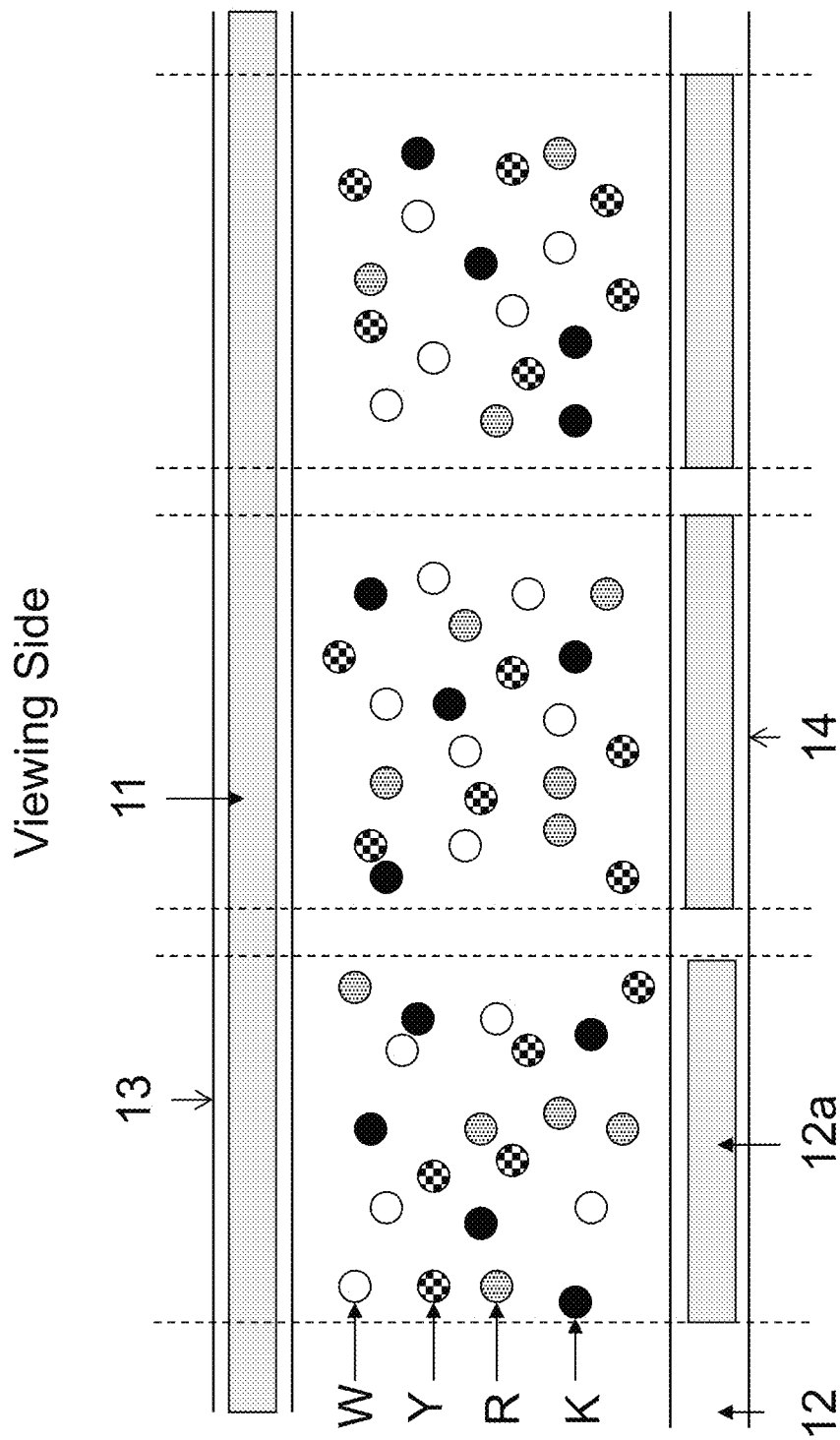
FIG. 1 is a schematic cross-section through a display layer containing four different types of particles and capable of displaying four different color states. The invention is primarily concerned with individually-controlled pixel electrodes (driving electrodes) on the non-viewing side, however alternative driving electrodes are also suitable for the invention. While the color states and waveforms (driving sequences) are primarily directed to a highly charged positive black particle, a lower charged positive red particle, a highly charged negative yellow particle, and a lower charged negative white particle, the invention is not limited to such color sets and it should be understood that the various pigment colors could be replaced as desired, however the interactions of the various charge states would remain the same.

As already mentioned, the present invention relates to a driving method for a display layer comprising an electrophoretic medium containing first, second, third and fourth types of particles all dispersed in a fluid and all having differing optical characteristics. These optical characteristics are typically colors perceptible to the human eye, but may be other optical properties, such as optical transmission, reflectance, luminescence or, in the case of displays intended for machine reading, pseudo-color in the sense of a change in reflectance of electromagnetic wavelengths outside the visible range. The invention broadly encompasses particles of any colors as long as the multiple types of particles are visually distinguishable.

The four types of particles present in the electrophoretic medium may be regarded as comprising two pairs of oppositely charged particles. The first pair (the first and second types of particles) consists of a first type of positive particles and a first type of negative particles; similarly, the second pair (third and fourth types of particles) consists of a second type of positive particles and a second type of negative particles. Of the two pairs of oppositely charged particles, one pair (the first and second particles) carries a stronger charge (e.g., greater magnitude, e.g., "higher charge") than the other pair (third and fourth particles). Therefore the four types of particles may also be referred to as high positive particles, high negative particles, low positive particles and low negative particles.

The term "charge potential", in the context of the present application, may be used interchangeably with "zeta potential" or with electrophoretic mobility. The charge polarities and levels of charge potential of the particles may be varied by the method described in U.S. Patent Application Publication No. 2014/0011913 and/or may be measured in terms of zeta potential. In one embodiment, the zeta potential is determined by Colloidal Dynamics AcoustoSizer IIM with a CSPU-100 signal processing unit, ESA EN # Attn flow through cell (K:127). The instrument constants, such as density of the solvent used in the sample, dielectric constant of the solvent, speed of sound in the solvent, viscosity of the solvent, all of which at the testing temperature (25° C.) are entered before testing. Pigment samples are dispersed in the solvent (which is usually a hydrocarbon fluid having less than 12 carbon atoms), and diluted to be 5-10% by weight. The sample also contains a charge control agent (Solsperse™ 17000, available from Lubrizol Corporation, a Berkshire Hathaway company), with a weight ratio of 1:10 of the charge control agent to the particles. The mass of the diluted sample is determined and the sample is then loaded into the flow through cell for determination of the zeta potential. Methods and apparatus for the measurement of electrophoretic mobility are well known to those skilled in the technology of electrophoretic displays.

As an example shown in FIG. 1, first, black particles (K) and second, yellow particles (Y) are the first pair of oppositely charged particles, and in this pair, the black particles are the high positive particles and the yellow particles are the high negative particles. Third, red particles (R) and fourth, white particles (W) are the second pair of oppositely charged particles, and in this pair, the red particles are the low positive particles and the white particles are the low negative particles.

In another example not shown, the black particles may be the high positive particles; the yellow particles may be the low positive particles; the white particles may be the low negative particles and the red particles may be the high negative particles. In another example not shown, the black particles may be the high positive particles; the yellow particles may be the low positive particles; the white particles may be the high negative particles and the red particles may be the low negative particles. In another example not shown, the black particles may be the high positive particles; the red particles may be the low positive particles; the white particles may be the high negative particles and the yellow particles may be the high negative particles. Of course, any particular color may be replaced with another color as required for the application. For example, if a specific combination of black, white, green, and red particles were desired, the high negative yellow particles shown in FIG. 1 could be replaced with high negative green particles.

In addition, the color states of the four types of particles may be intentionally mixed. For example, yellow pigment by nature often has a greenish tint and if a better yellow color state is desired, yellow particles and red particles may be used where both types of particles carry the same charge polarity and the yellow particles are higher charged than the red particles. As a result, at the yellow state, there will be a small amount of the red particles mixed with the greenish yellow particles to cause the yellow state to have better color purity.

In some embodiments, the particles are opaque, in the sense that they should be light reflecting not light transmissive. In other embodiments some of the particles are light transmissive, i.e., partially-light-transmissive as described in WO2021/247991, allowing additive color combinations whereby the partially-light transmissive particles only absorb a portion of the spectrum of the incoming light, and allowing the rest of the light to pass through the partially-light transmissive particles and interact with particles that are immediately behind the partially-light transmissive particles. White particles are of course light scattering rather than reflective but care should be taken to ensure that not too much light passes through a layer of white particles. For example, if in the white state shown in FIG. 2F, discussed below, the layer of white particles allowed a substantial amount of light to pass through, and be reflected from the black and yellow particles behind it, the brightness of the white state could be substantially reduced.

In some embodiments, the particles are primary particles without a polymer shell. Alternatively, each particle may comprise an insoluble core with a polymer shell. The core could be either an organic or inorganic pigment, and it may be a single core particle or an aggregate of multiple core particles. The particles may also be hollow particles.

White particles may be formed from an inorganic pigment, such as $TiO_2$, $ZrO_2$, ZnO, $Al_2O_3$, $Sb_2O_3$, $BaSO_4$, $PbSO_4$ or the like. Black particles may be formed from CI pigment black 26 or 28 or the like (e.g., manganese ferrite black spinel or copper chromite black spinel) or carbon black. The other colored particles (which are non-white and non-black) may be red, green, blue, magenta, cyan, yellow or any other desired colored, and may be formed from, for example, CI pigment PR 254, PR122, PR149, PG36, PG58, PG7, PB28, PB15:3, PY83, PY138, PY150, PY155 or PY20. Those are commonly used organic pigments described in color index handbooks, "New Pigment Application Technology" (CMC Publishing Co, Ltd, 1986) and "Printing Ink Technology" (CMC Publishing Co, Ltd, 1984). Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Novoperm Yellow HR-70-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow. The colored particles may also be inorganic pigments, such as red, green, blue and yellow. Examples may include, but are not limited to, CI pigment blue 28, CI pigment green 50 and CI pigment yellow 227.

The fluid in which the four types of particles are dispersed may be clear and colorless. It preferably has a low viscosity and a dielectric constant in the range of about 2 to about 30, preferably about 2 to about 15 for high particle mobility. Examples of suitable dielectric solvent include hydrocarbons such as isoparaffin, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotrifluoride, chloropentafluorobenzene, dichlorononane or pentachlorobenzene, and perfluorinated solvents such as FC-43, FC-70 or FC-5060 from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden from Ausimont or Krytox Oils and Greases K-Fluid Series from DuPont, Delaware, polydimethylsiloxane based silicone oil from Dow-corning (DC-200).

The percentages of different types of particles in the fluid may vary. For example, one type of particles may take up 0.1% to 10%, preferably 0.5% to 5%, by volume of the electrophoretic fluid; another type of particles may take up 1% to 50%, preferably 5% to 20%, by volume of the fluid; and each of the remaining types of particles may take up 2% to 20%, preferably 4% to 10%, by volume of the fluid.

The various types of particles may have different particle sizes. For example, the smaller particles may have a size which ranges from about 50 nm to about 800 nm. The larger particles may have a size which is about 2 to about 50 times, and more preferably about 2 to about 10 times, the sizes of the smaller particles.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. Typically, each pixel is defined by a single driving field, for example an addressable electric field between a driving (pixel) electrode and a top light-transmissive electrode. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In some embodiments, each pixel electrode is coupled to a single thin-film transistor, which is additionally coupled to a data line and a gate line. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

Numerous patents and applications assigned to or in the names of the Massachusetts Institute of Technology (MIT), E Ink Corporation, E Ink California, LLC, E Ink Holdings, Prime View International, and related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 7,075,502 and 7,839,564;

(h) Methods for driving displays; see for example U.S. Pat. Nos. 7,012,600 and 7,453,445;

(i) Applications of displays; see for example U.S. Pat. Nos. 7,312,784 and 8,009,348; and (j) Non-electrophoretic displays, as described in U.S. Pat. No. 6,241,921 and U.S. Patent Applications Publication No. 2015/0277160; and applications of encapsulation and microcell technology other than displays; see for example U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, International Application Publication No. WO 02/01281, and U.S. Pat. No. 6,788,449.

Preferred embodiments of the invention will now be described in detail, though by way of illustration only, with reference to the accompanying drawings.

FIG. 1 is a schematic cross-section through a display layer which can be driven by methods of the present invention. The display layer has two major surfaces, a first, viewing surface 13 (the upper surface as illustrated in FIG. 1) through which a user views the display, and a second surface 14 on the opposed side of the display layer from the first surface 13. The display layer comprises an electrophoretic medium comprising a fluid and first, black particles (K) having a high positive charge, second, yellow particles (Y) having a high negative charge, third, red particles (R) have a low positive charge, and fourth, white particles (W) having a low negative charge. The display layer is provided with electrodes as known in the art for applying electric fields across the display layer, i.e., including two electrode layers, the first of which is a light-transmissive or transparent common electrode layer 11 extending across the entire viewing surface 13 of the display layer. This electrode layer 11 may be formed from indium tin oxide (ITO) or a similar light-transmissive conductor. The other electrode layer 12 is a layer of discrete pixel electrodes 12a on the second surface 14, these electrodes 12a defining individual pixel of the display, these pixels being indicated by dotted vertical lines in FIG. 1. Alternatively, the other electrode layer 12 could be a solid electrode, e.g., a metal foil, or a graphite plane, or a conductive polymer. Alternatively, electrode layer 12 could also be a light-transmissive or transparent electrode layer, similar to transparent common electrode layer 11. An electric field is created for a pixel by the potential difference between a voltage applied to the common electrode and a voltage applied to the corresponding pixel electrode. The pixel electrodes 12a may form part of an active matrix driving system with, for example, a thin film transistor (TFT) backplane, but other types of electrode addressing may be used provided the electrodes provide the necessary electric field across the display layer. In some embodiments, a plurality of electrodes are directly controlled with switches that allow the desired charge to be delivered to the pixel electrodes. In some embodiments, the electrode layer 12 may be segmented so that pre-determined patterns appear at the viewing side when those segmented electrodes are energized.

The pixel electrodes may be as described in U.S. Pat. No. 7,046,228. The pixel electrodes 12a may form part of an active matrix thin film transistor (TFT) backplane, but other types of electrode addressing may be used provided the electrodes provide the necessary electric field across the display layer.

In one embodiment, the charge carried by the "low charge" particles may be less than about 50%, preferably about 5% to about 30%, of the charge carried by the "high charge" particles. In another embodiment, the "low charge" particles may be less than about 75%, or about 15% to about 55%, of the charge carried by the "high charge" particles. In a further embodiment, the comparison of the charge levels as indicated applies to two types of particles having the same charge polarity. The charges on the "high positive" particles and the "high negative" particles may be the same or different. Likewise, the amplitudes of the "low positive" particles and the "low negative" particles may be the same or different. In any specific electrophoretic fluid, the two pairs of high-low charge particles may have different levels of charge differentials. For example, in one pair, the low positive charged particles may have a charge intensity which is 30% of the charge intensity of the high positive charged particles and in another pair, the low negative charged particles may have a charge intensity which is 50% of the charge intensity of the high negative charged particles.

FIGS. 2A-2J illustrate the six color states which can be displayed at the viewing surface of each pixel of the display layer shown in FIG. 1 and the transitions between them. As previously noted, the high positive particles are of a black color (K); the high negative particles are of a yellow color (Y); the low positive particles are of a red color (R); and the low negative particles are of a white color (W).

In FIGS. 2A and 2B, when a high negative driving voltage (referred to below as $V_{H2}$, e.g., −15V, e.g., −30V) is applied to the pixel electrode 22a (hereinafter, it will be assumed that the common electrode 21 will be maintained at 0V, so in this case the common electrode is strongly positive relative to the pixel electrode) for a time period of sufficient length, an electric field is generated to cause the high negative yellow particles to be driven adjacent the common electrode 21 and the high positive black particles driven adjacent the pixel electrode 22a to produce the state of FIG. 2A.

The low positive red R and low negative white W particles, because they carry weaker charges, move slower than the higher charged black and yellow particles and as a result, they stay in the middle of the pixel, with white particles above the red particles, and with both masked by the yellow particles and therefore not visible at the viewing surface. Thus, a yellow color is displayed at the viewing surface.

Conversely, when a high positive driving voltage (referred to below as $V_{H1}$, e.g., +15V, e.g., +30V) is applied to the pixel electrode 22a (so that the common electrode 21 is strongly negative relative to the pixel electrode) for a time period of sufficient length, an electric field is generated to cause the high positive black particles to be driven adjacent the common electrode 21 and the high negative yellow particles adjacent the pixel electrode 22a. The resulting state of FIG. 2B is the exact inverse of FIG. 2A and a black color is displayed at the viewing surface.

FIGS. 2C and 2D illustrate the manner in which the low positive (red) particles are displayed at the viewing surface of the display layer shown in FIG. 1. The process starts from the (yellow) state shown in FIG. 2A and repeated as FIG. 2C. A low positive voltage ($V_{L1}$, e.g., +3V, e.g., +5V, e.g., +10V) is applied to the pixel electrode 22a (i.e., the common electrode 21 is made slightly negative with respect to the pixel electrode) for a time period of sufficient length to cause the high negative yellow particles to move towards the pixel electrode 22a while the high positive black move towards the common electrode 21. However, when the yellow and black particles meet intermediate the pixel and common electrodes as shown in FIG. 2D, they remain at the intermediate position because the electric field generated by the low driving voltage is not strong enough to overcome the attractive forces between them. As shown, the yellow and black particles stay intermediate the pixel and common electrodes in a mixed state.

The term "attractive force" as used herein, encompasses electrostatic interactions, linearly dependent on the particle charge potentials, and the attractive force can be further enhanced by other forces, such as Van der Waals forces, hydrophobic interactions and the like.

Obviously, attractive forces also exist between the low positive red particles and the high negative yellow particles, and between the low negative white particles and the high positive black particles. However, these attractive forces are not as strong as the attractive forces between the black and yellow particles, and thus the weak attractive forces on the red and white particles can be overcome by the electric field generated by the low driving voltage, so that the low charged particles and the high charged particles of opposite polarity can be separated. The electric field generated by the low driving voltage is also sufficient to separate the low negative white and low positive red particles, thereby causing the red particles to move adjacent the common electrode 21 and the white particles to move adjacent the pixel electrode 22a. As a result, the pixel displays a red color, while the white particles lie closest to the pixel electrode, as shown in FIG. 2D.

FIGS. 2E and 2F illustrate the manner in which the low negative (white) particles are displayed at the viewing surface of the display shown in FIG. 1. The process starts from the (black) state of FIG. 2B and repeated as FIG. 2E. A low negative voltage ($V_{L2}$, e.g., −3V, e.g., −5V, e.g., −10V) is applied to the pixel electrode (i.e., the common electrode is made slightly positive with respect to the pixel electrode) for a time period of sufficient length to cause the high positive black particles to move towards the pixel electrode 22a while the high negative yellow particles move towards the common electrode 21. However, when the yellow and black particles meet intermediate the pixel and common electrodes as shown in FIG. 2F, they remain at the intermediate position because the electric field generated by the low driving voltage is not strong enough to overcome the attractive forces between them. Thus, as previously discussed with reference to FIG. 2D, the yellow and black particles stay intermediate the pixel and common electrodes in a mixed state.

As discussed above with reference to FIGS. 2C and 2D, attractive forces also exist between the low positive red particles and the high negative yellow particles, and between the low negative white particles and both the high positive black particles. However, these attractive forces are not as strong as the attractive forces between the black and yellow particles, and thus the weak attractive forces on the red and white particles can be overcome by the electric field generated by the low driving voltage, so that the low charged particles and the high charged particles of opposite polarity can be separated. The electric field generated by the low driving voltage is sufficient to separate the low negative white and low positive red particles, thereby causing the white particles to move adjacent the common electrode 21 and the red particles to move adjacent the pixel electrode 22a. As a result, the pixel displays a white color, while the red particles lie closest to the pixel electrode, as shown in FIG. 2F.

FIGS. 2G and 2H illustrate the manner in which a mixture of the low positive (red) particles and the high negative (yellow) particles can be displayed at the viewing surface of the display layer shown in FIG. 1. The process is essentially a continuation of the process leading to the red state, e.g., as shown in FIGS. 2C and 2D. Having achieve a quality red state, a shortened high negative voltage ($V_{H2}$, e.g., −15V, e.g., −30V) is provided to drive a portion of the high negative (yellow) particles toward the viewing surface, but the impulse is insufficient to achieve a full yellow state as shown in FIG. 2A. As explained in greater detail below, achieving a successful orange state depends upon achieving the predicate red state. Accordingly, most of the waveform to achieve the orange optical state is identical to the red waveform.

FIGS. 2I and 2J illustrate the manner in which a mixture of the low negative (white) particles and the high positive (black) particles can be displayed at the viewing surface of the display layer shown in FIG. 1. The process is essentially a continuation of the process leading to the white state, e.g., as shown in FIGS. 2E and 2F. Having achieve a quality white state, a shortened high positive voltage ($V_{H1}$, e.g., +15V, e.g., +30V) is provided to drive a portion of the high positive (black) particles toward the viewing surface, but the impulse is insufficient to achieve a full black state as shown in FIG. 2B. As explained in greater detail below, achieving a successful gray state depends upon achieving the predicate white state. Accordingly, most of the waveform to achieve the gray optical state is identical to the white waveform.

In the display layer shown in FIGS. 1 and 2A-2J the black particles (K) carry a high positive charge, the yellow particles (Y) carry a high negative charge, the red (R) particles carry a low positive charge and the white particles (W) carry a low negative charge, however in principle, the particles carrying a high positive charge, or a high negative charge, or a low positive charge or a low negative charge may be of any colors. All of these variations are intended to be within the scope of this application.

It should also be noted that the low potential difference applied to reach the color states of FIGS. 2D and 2F may be about 5% to about 50% of the high potential difference required to drive the pixel from the color state of high positive particles to the color state of the high negative particles, or vice versa, i.e., as shown in FIGS. 2A and 2B.

Although for ease of illustration, FIGS. 1 and 2A-2J show the display layer as unencapsulated, the electrophoretic fluid may be filled into display cells, which may be cup-like microcells as described in U.S. Pat. No. 6,930,818. The display cells may also be other types of micro-containers, such as microcapsules, microchannels or equivalents, regardless of their shapes or sizes. All of these are within the scope of the present application.

It will readily be apparent to those skilled in imaging science that if "clean", well saturated colors are to be obtained in the various color states illustrated in FIGS. 2A-2J, all non-black and non-white particles used in the electrophoretic medium should be light-reflecting rather than light-transmissive. (White particles are inherently light-scattering, while black particles are inherently light-absorbing.) For example, in the red color state of FIG. 2D, if the red particles were substantially light-transmissive, a substantial proportion of the light entering the electrophoretic layer through the viewing surface would pass through the red particles and a proportion of this transmitted light would be reflected back from the yellow particles "behind" (i.e., below as illustrated in FIG. 2D) the red particles. The overall effect would be serious "contamination" of the desired red color with a yellow tinge.

Figure 16A:
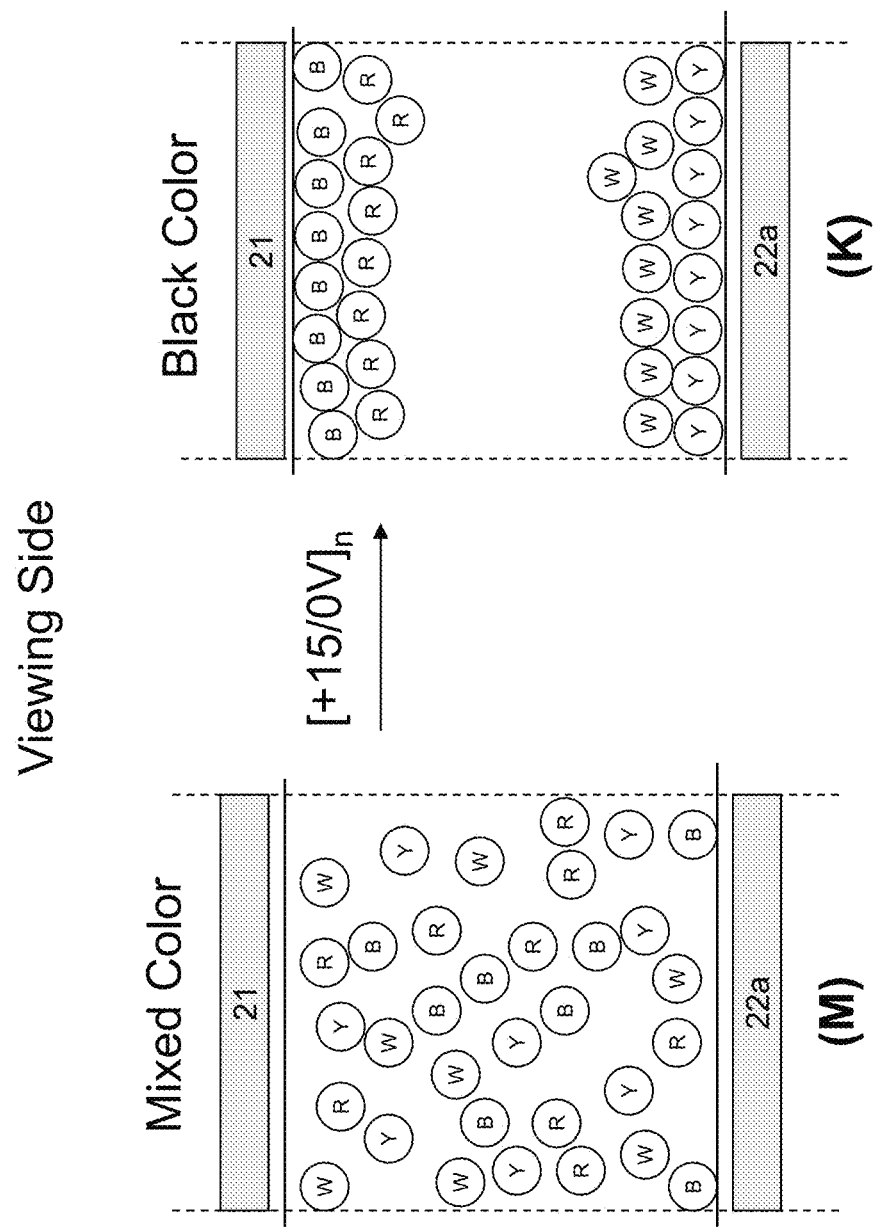

However, using carefully-chosen pigments, such as Hostaperm Red D3G 70 pigment or Kremer Pigmente 45030 Ultramarine Blue pigment allows for partial transmission and partial reflection of incident light, allowing for the stacked color states to produce a first color when the partially-light-transmissive pigments are arranged between the viewer and the white pigment, and a second color when the partially light-transmissive pigments are mixed with a reflective pigment, as shown in FIGS. 16A-16F (light-transmissive blue particles) and 17A-17F (light-transmissive red particles). For example, when the two pigments are arranged as shown in FIG. 16A, with the partially-light-transmissive blue pigment adjacent a viewing surface and the reflective red pigment immediately on the opposed side of the blue pigment from the viewing surface, all visible radiation which enters through the viewing surface and passes through the blue pigment will be absorbed by the red pigment and the viewing surface will appear black.

Regarding FIGS. 16A-16F, the high positive partially-light-transmissive particles are of a blue color (B); the high negative particles are of a yellow color (Y); the low positive particles are of a red color (R); and the low negative particles are of a white color (W). The transition shown in FIG. 16A starts from a completely mixed state, denoted "(M)", produced by applying shaking pulses as described below. When alternating pulses of a high positive potential difference (e.g., +15V) and no potential difference (0 V) are applied to the pixel electrode 22a for a time period of sufficient length, the blue (B) and red (R) particles are driven towards the common electrode (21) or viewing side, and the yellow and white particles are driven towards the pixel electrode 22a side. The red (R) and white (W) particles, because they carry weaker charges, move slower than the highly charged blue and yellow particles. As a result, the blue particles lie immediately adjacent the common electrode, with the red particles immediately below them (as illustrated in FIG. 16A). For reasons already discussed above, this causes the pixel to appear black, denoted "(K)" in FIG. 16A; the white and yellow particles are masked by the reflecting red particles and do not affect the displayed color.

Similarly, the transition shown in FIG. 16B starts from the completely mixed state (M), produced by applying shaking pulses as described below. When alternating pulses of a high negative potential difference (e.g., −15V) and no voltage (0 V) are applied to the pixel electrode 22a for a time period of sufficient length, the blue (B) and red (R) particles are driven towards the pixel electrode 22a side, and the yellow and white particles to be driven towards the common electrode side. The red (R) and white (W) particles, because they carry weaker charges, move slower than the highly charged blue and yellow particles. As a result, the reflective yellow particles lie immediately adjacent the common electrode, thus causing the pixel to appear yellow, denoted "(Y)" in FIG. 16B; the white, red and blue particles are all masked by the reflecting yellow particles and do not affect the displayed color. Although in principle the yellow color can be produced by alternating pulses of −15V and 0 V, in practice a more complicated waveform is preferred.

Figure 16B:
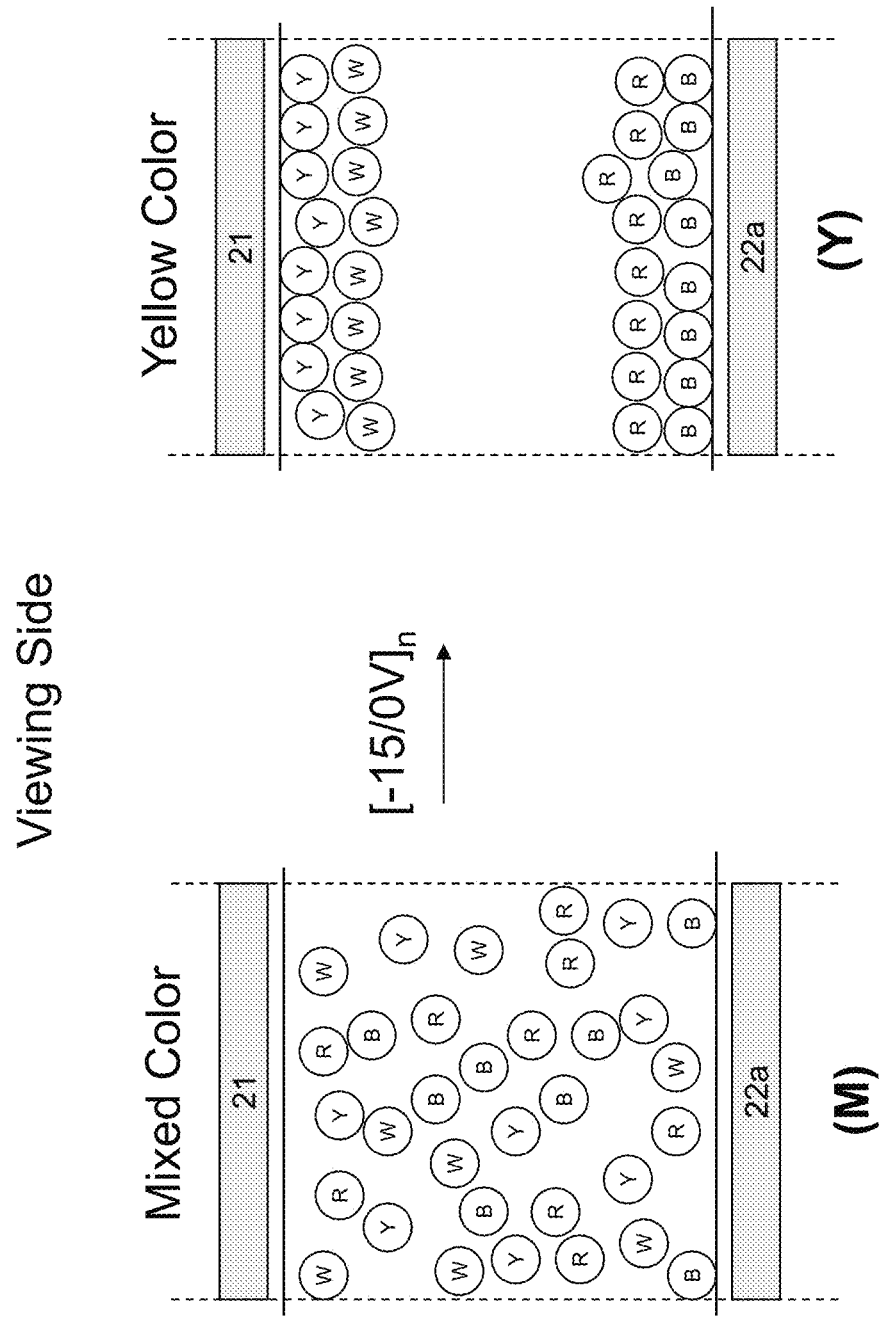
Figure 16C:
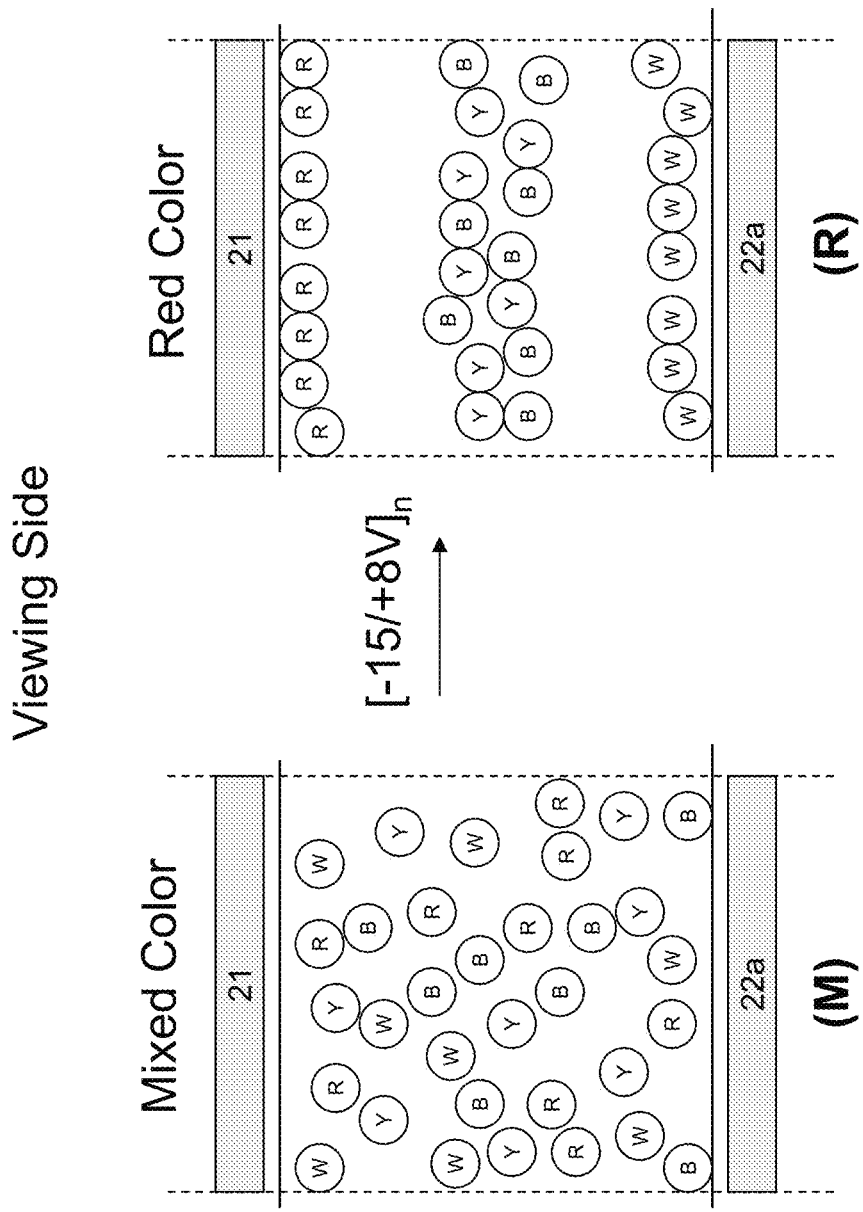

The transition shown in FIG. 16C starts from the completely mixed state (M). When alternating pulses of a high negative potential difference (e.g., −15V) and a low positive potential difference (e.g., +8V), with the low positive pulses being much longer than the high negative pulses, are applied to the pixel electrode 22a for a time period of sufficient length, the red (R) particles are driven towards the common electrode 21 side, and the white particles (W) are driven towards the pixel electrode 22a side. The effect of the oscillating electric field is to cause the highly charged blue and yellow particles to pass each other repeatedly in the middle of the thickness of the electrophoretic layer, and the strong electrical attraction between the highly charged positive and negative particles greatly slows the movement of these particles and tends to keep them in the middle of the thickness of the electrophoretic layer. However, the electric field generated by the low positive pulses is sufficient to separate the low charged white and red particles, thereby allowing the low positive red particles (R) to move all the way to the common electrode 21 side and the low negative white particles to move to the pixel electrode 22a side. As a result, the reflective red particles lie immediately adjacent the common electrode, thus causing the pixel to appear red, denoted "(R)" in FIG. 16C; the white, yellow and blue particles are all masked by the reflecting red particles and do not affect the displayed color. Importantly, this system allows weaker charged particles to be separated from the stronger charged particles of the opposite polarity.

The transition shown in FIG. 16D starts from the completely mixed state (M). When alternating pulses of a high positive potential difference (e.g., +15V) and a low negative potential difference (e.g., −8V), with the low negative pulses being much longer than the high positive pulses, are applied to the pixel electrode 22a for a time period of sufficient length, the red (R) particles are driven towards the pixel electrode 22a side, and the white particles (W) are driven towards the common electrode 21 side. As in the transition shown in FIG. 16C, the effect of the oscillating electric field is to cause the highly charged blue and yellow particles to remain together in the middle of the thickness of the electrophoretic layer. However, the electric field generated by the low negative pulses is sufficient to separate the low charged white and red particles, thereby allowing the low positive red particles (R) to move all the way to the pixel electrode 22a side and the low negative white particles to move to the common electrode 21 side. As a result, the white particles lie immediately adjacent the common electrode, thus causing the pixel to appear white, denoted "(W)" in FIG. 16D; the red, yellow and blue particles are all masked by the white particles and do not affect the displayed color. Although in principle the white color can be produced by alternating pulses of +15 V and −8 V, in practice a more complicated waveform is preferred.

Figure 16E:
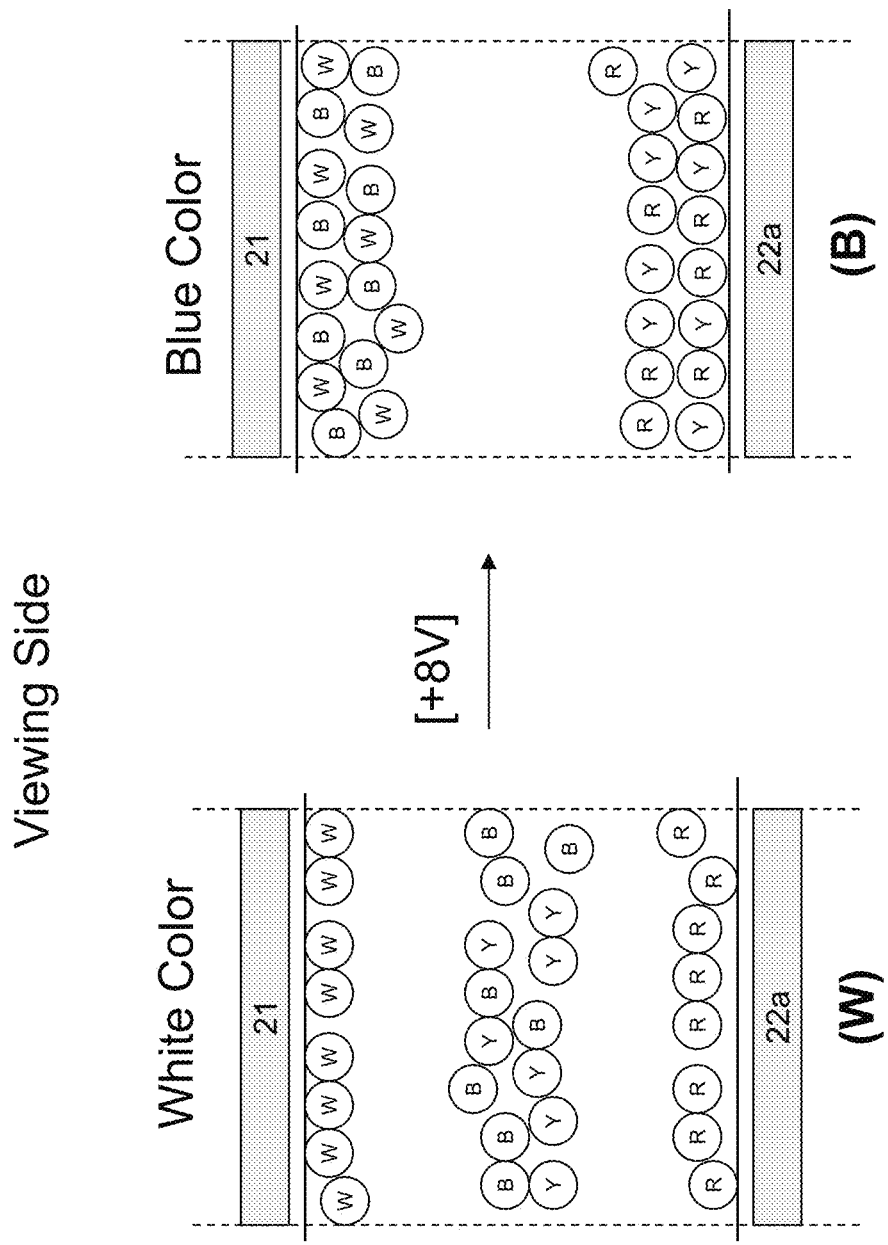

The transition shown in FIG. 16E starts from the white state (W) shown in FIG. 16D. To the device in this state is applied a positive potential difference pulse the overall impulse of which is not sufficient to drive the device to the black state (K) shown in FIG. 16A. The positive pulse causes the highly charged blue particles to move towards the common electrode 21 side and the white particles to move towards the pixel electrode 22a side. However, since the highly charged blue particles move more quickly than the low charged white particles, a mixture of the blue particles and the white particles is visible through the viewing surface, so that the pixel appears blue.

It might at first appear from FIG. 16E that the saturation of the blue color seen at the viewing surface would be substantially reduced because of reflection from white pigment disposed immediately adjacent the front electrode. However, it should be understood that FIG. 16E (and also FIGS. 16A-16D, 16F, and 17A-17F) are all highly schematic. In practice pigment particles are not spherical (because the crystalline pigments used fracture preferentially along certain crystal planes—for example, rutile titania, commonly used as the white pigment in electrophoretic media is tetragonal and tends to form square prisms), the particles vary considerably in size, the "reflection" from the white particles is essentially Lambertian light-scattering rather than specular reflection, and several more layers of particles are present than are illustrated in FIG. 16E. (The exact number of layers depends of course upon the particle loading in the electrophoretic medium, the thickness of this medium and the sizes of the individual particles, but in practice at least 5-10 layers are normally present.) The overall effect of all the foregoing factors is that only a very small proportion of the visible light entering the electrophoretic medium through the viewing surface is reflected directly back through the viewing surface by the white particles, and in practice a well saturated blue can be achieved.

Also, although FIG. 16A shows the blue and red particles in completely separate layers, whereas FIG. 16E shows a complete admixture of the blue and white particles, it will be appreciated that these represent two extreme states, and in practice there can be a continuous graduation between completely separate layers and complete admixture. Provided that the requisite colors are obtained, the present invention is not limited to any theoretical explanation regarding the exact positions of the particles and their degree of admixture with other particles.

Figure 16F:
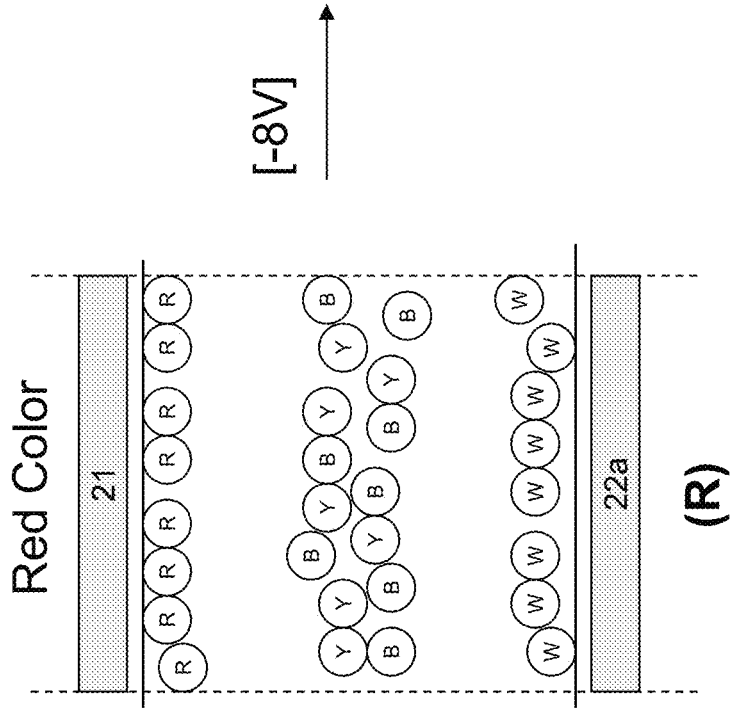

Finally, the transition shown in FIG. 16F starts from the red state (R) shown in FIG. 16C. To the device in this state is applied a negative potential difference pulse the overall impulse of which is not sufficient to drive the device to the yellow state (Y) shown in FIG. 16B. The negative pulse causes the highly negative yellow particles to move towards the common electrode (21) side, while the low positive red particles move much more slowly towards the pixel electrode (22a) side. The result is that a mixture of the red and yellow particles is visible through the common electrode 21 and the pixel appears orange.

Figure 17B:
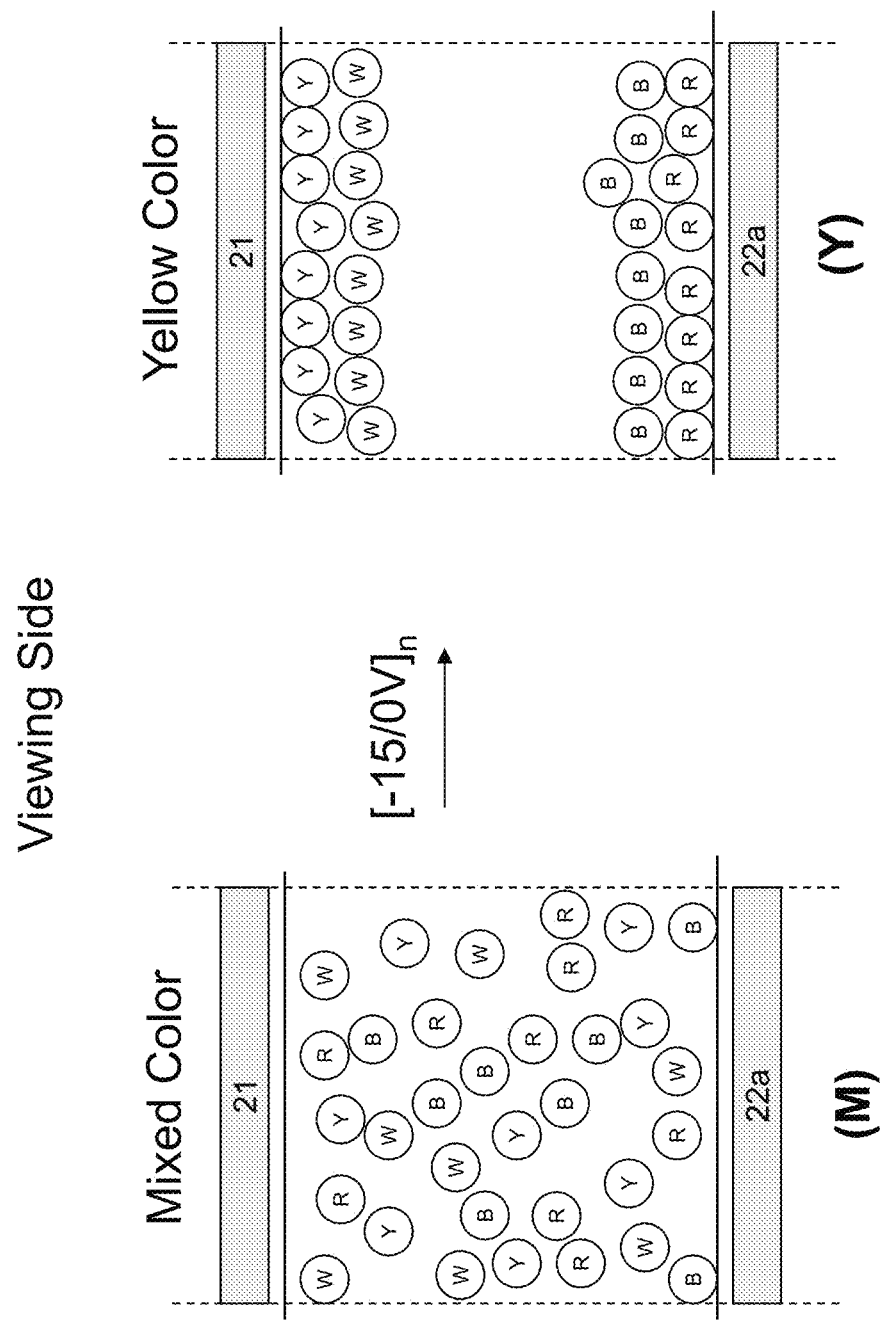

An alternative embodiment, using a partially-light-transmissive red particle is illustrated in FIGS. 17A-17F. FIG. 17A shows a transition similar to that shown in FIG. 16A, starting from the completely mixed state (M). In the final state (K), the red light-transmissive particles lie immediately adjacent the common electrode 21, with the blue reflective particles immediately below them (as illustrated in FIG. 17A) so that, despite the reversal of the positions of the red and blue particles as compared with FIG. 16A, a black optical state is still generated.

FIG. 17B shows a transition similar to that shown in FIG. 16B. A yellow state is again produced, since the yellow particles adjacent the common electrode mask the white, red and blue particles, so that the reversal of the positions of the red and blue particles in FIG. 17B, as compared with FIG. 16B, has no effect upon the optical state.

Figure 17C:
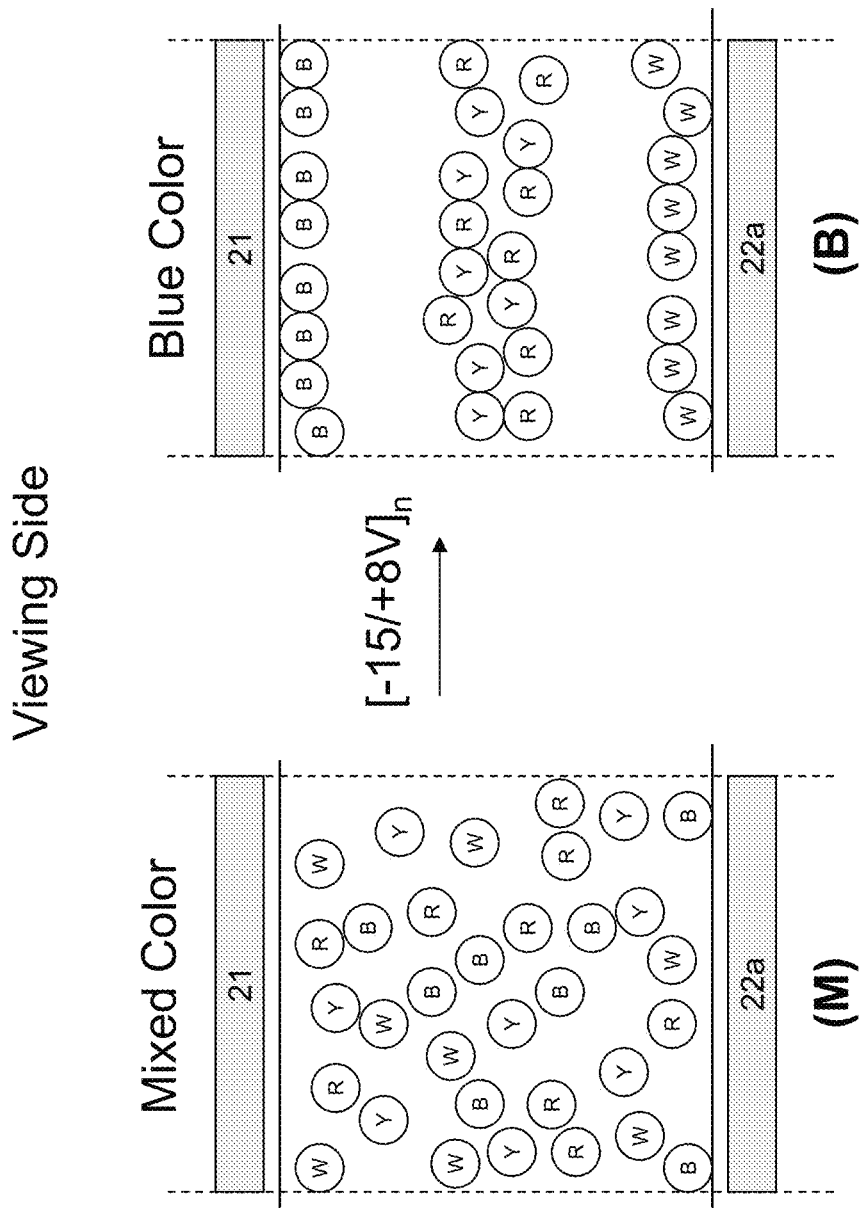

FIG. 17C shows a transition similar to that shown in FIG. 16C. As in FIG. 16C, the transition of FIG. 17C brings the low positive particles adjacent the common electrode, and since these low positive particles are now the reflective blue particles, a blue optical state is produced rather than the red optical state of FIG. 16C.

Figure 17D:
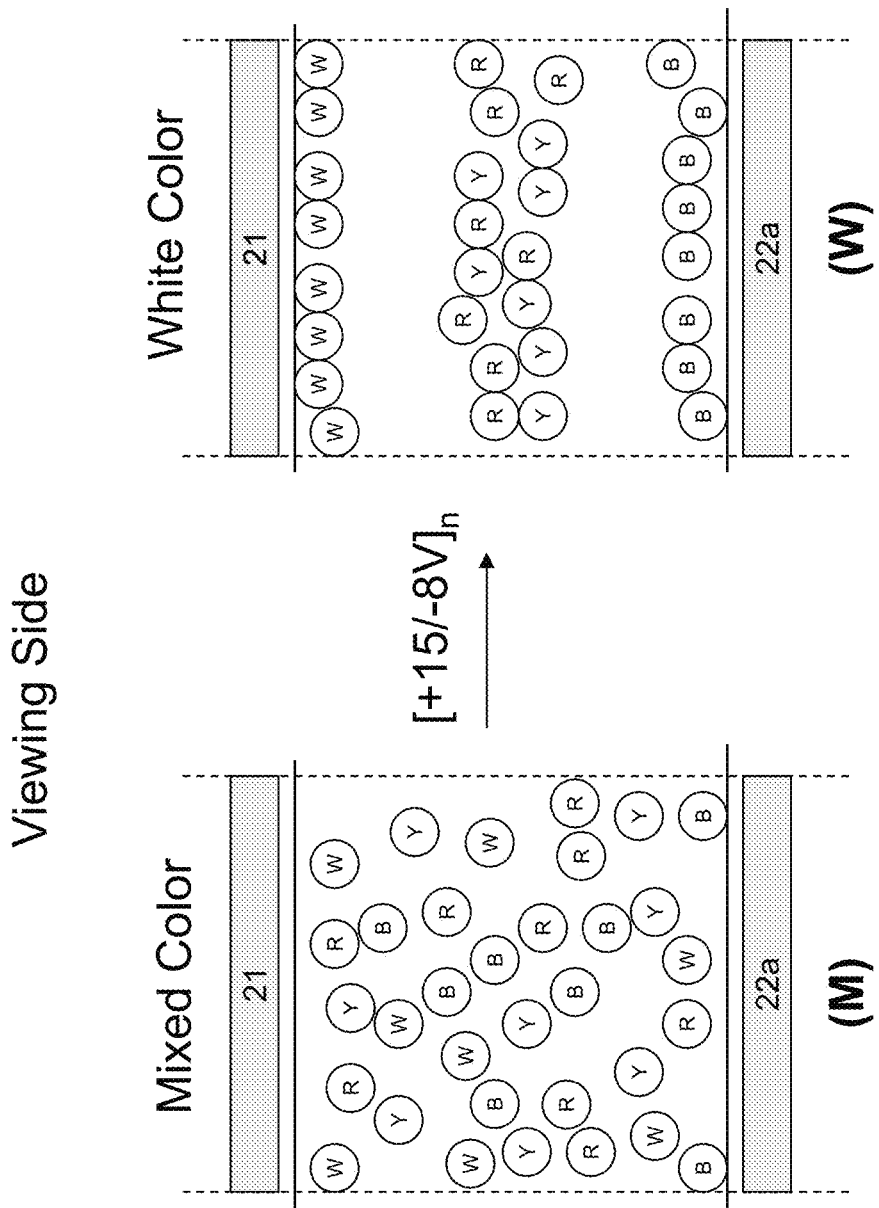

FIG. 17D shows a transition similar to that shown in FIG. 16D. A white state is again produced, since the white particles adjacent the common electrode mask the yellow, red and blue particles, so that the reversal of the positions of the red and blue particles in FIG. 17D, as compared with FIG. 16D, has no effect upon the optical state.

Figure 17E:
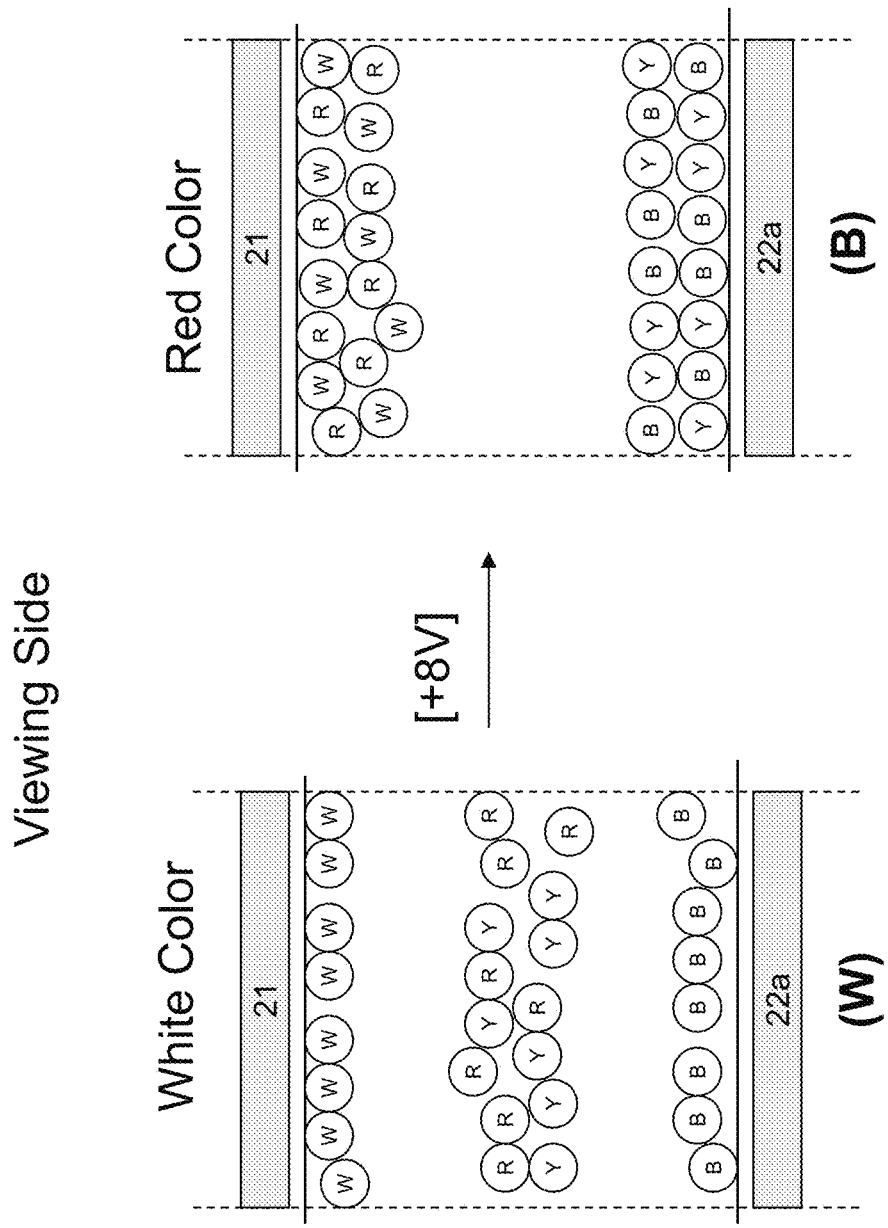

FIG. 17E shows a transition similar to that shown in FIG. 16E. As in FIG. 16E, the transition of FIG. 17E brings a mixture of the high positive particles and the white particles adjacent the common electrode, and since these high positive particles are now the light-transmissive red particles, a red optical state (R) is produced rather than the blue optical state of FIG. 16E.

Finally, FIG. 17F shows a transition similar to that shown in FIG. 16F. The initial state is the state in which the low positive particles lie adjacent the common electrode, which in the medium of FIG. 17F is the blue optical state (B). Accordingly, the final state has a mixture of the low positive blue particles and the high negative yellow particles adjacent the common electrode, and hence a green optical state (G) is displayed.

In order to ensure both color brightness and color purity, a shaking waveform may be applied prior to driving the display layer from one color state to another color state. FIG. 3 is a voltage versus time graph of such a shaking waveform. The shaking waveform may consist of repeating a pair of opposite driving pulses for many cycles. When used with an active matrix display each positive or negative pulse is at least the frame width of an update. For example, each pulse width may be on the order of 16 msec, when a display is updated at 60 Hz. However, in fact, the frame times are typically a bit longer due to various charge and decay times for the capacitive elements of the backplane. For example, as shown in FIG. 3, the shaking waveform may consist of a +15V pulse for 20 msec and a −15V pulse for 20 msec, with this pair of pulses being repeated 50 times. The total duration of such a shaking waveform would be 2000 msec. For ease of illustration, FIG. 3 illustrates only seven pairs of pulses.

The pulse width need not be limited to the frame time, and each pulse may include multiple frames, e.g., 40 msec pulse width, e.g. 60 msec pulse width, e.g., 80 msec pulse width, e.g., 100 msec pulse width. In some embodiments the pulse width of each element of the shaking pulse may be 80 msec or less, e.g., 60 msec or less, e.g., 40 msec or less, e.g., 20 msec or less. In practice, there may be at least 4 repetitions (i.e., four pairs of positive and negative pulses), e.g. at least 6 repetitions, e.g. at least 8 repetitions, e.g. at least 10 repetitions, e.g. at least 12 repetitions, e.g. at least 15 repetitions. Similarly, all subsequent drawings showing shaking waveforms simplify the shaking waveform in the same manner. The shaking waveform may be applied regardless of the optical state prior to a driving voltage being applied. After the shaking waveform is applied, the optical state (at either the viewing surface or the second surface, if visible) will not be a pure color, but will be a mixture of the colors of the various types of pigment particles. In some instances multiple shaking pulses will be delivered with a pause of 0V between shaking pulses to allow the electrophoretic medium to equilibrate and/or allow accumulated charge on the electrodes to dissipate.

Each of the driving pulses in the shaking waveform is applied for not exceeding 50% (or not exceeding 30%, 10% or 5%) of the driving time required for driving from the color state of the high positive particles to the color state of the high negative particles, or vice versa. For example, if it takes 300 msec to drive a display device from the color state of FIG. 2B, to the high positive particles to the color state of FIG. 2A, or vice versa, the shaking waveform may consist of positive and negative pulses, each applied for not more than 150 msec. In practice, it is preferred that the pulses be shorter.

For present purposes, a high driving voltage ($V_{H1}$ or $V_{H2}$) is defined as a driving voltage which is sufficient to drive a pixel from the color state of high positive particles to the color state of high negative particles, or vice versa (see FIGS. 2A and 2B). A low driving voltage ($V_{L1}$ or $V_{L2}$) is defined as a driving voltage which may be sufficient to drive a pixel to the color state of low charged particles from the color state of high charged particles (see FIGS. 2D and 2F). In general, the magnitude of $V_L$ (e.g., $V_{L1}$ or $V_{L2}$) is less than 50%, or preferably less than 40%, of the amplitude of $V_H$ (e.g., $V_{H1}$ or $V_{H2}$).

FIG. 4A illustrates a standard waveform that may be used to effect the yellow to red (high negative to low positive) transition of FIGS. 2C and 2D. In the waveform of FIG. 4A, a high negative driving voltage ($V_{H2}$, e.g., −15V) is applied for a period of t1 to drive the pixel towards the yellow state (see FIG. 2C). This initial application of a high negative driving voltage is known as the balance phase and is included to ensure that the entire waveform of FIG. 4A is DC balanced. (The term "DC balanced" is used herein to mean that the integral of the driving voltage applied to a pixel with respect to time taken over an entire waveform is substantially zero.) The balance pulse of t1 may last for 500 ms or more, e.g., longer than 1 sec. A shaking waveform (a.k.a. mixing waveform) is then applied, followed by application of the high negative driving voltage ($V_{H2}$) for a period of t2, which places the pixel in the yellow state shown in FIG. 2C. The width of period t2 is typically smaller than t1, for example half as long, e.g., about 200 ms, or about 250 ms, or about 500 ms. In some embodiments of FIG. 4A, each pulse of the shaking pulse may be about 80 ms wide, however longer or shorter pulse widths are acceptable. From this yellow state, the pixel is driven to the red state by applying a low positive driving voltage ($V_{L1}$, for example +3V) for a period of t3, to effect the yellow-to-red transition shown going from FIG. 2C to FIG. 2D. The period t2 is sufficient to drive the pixel to the yellow state when $V_{H2}$ is applied and the period t3 is sufficient to drive the pixel to the red state from the yellow state when $V_{L1}$ is applied. The period t3 is typically longer than t2, e.g., about 300 ms, e.g., about 400 ms, e.g, about 600 ms. It is understood that the waveform of FIG. 4A is a "base" waveform for preparation of red at the viewing surface.

In many commercial applications, a base waveform, e.g., as shown in FIG. 4A is insufficient to provide the rich colors desired by the user. Accordingly, portions of the waveform may be repeated, for example the balance pulse and the shaking pulse may be repeated before the first driving pulse is applied. In some embodiments, there may be a pause of 0V between repeated portions of the waveform, i.e., balance, shake, pause, balance, shake. Additionally, clean up pulses may be added to the waveform as described in U.S. Pat. No. 10,586,499, which is incorporated by reference in its entirety. An example of a repeating waveform, suitable for achieving a saturated red state is shown in FIG. 4B. In the example of FIG. 4B, the balance pulse, t1, shaking pulse, and pre-pulse, t2, are roughly equivalent to FIG. 4A, but the addressing pulse, t3, has been replaced with a series of repetitive pulses of $t_{17}$ and $t_{18}$, as shown in FIG. 4B. Typically, pulse t17 is a high negative pulse, and has a pulse width of between 20-400 msec, while t18 is a low positive pulse having a pulse width of >200 msec. The series of pulses is repeated for least 2 cycles (N>2), preferably at least 4 cycles and more preferably at least 8 cycles. The red color becomes more intense after each driving cycle. A number of modifications are available to FIG. 4B, including providing a zero volt "wait" pulse between $t_{17}$ and $t_{18}$, e.g., as shown in U.S. Pat. No. 9,640,119. Adding wait pulses may be useful with synchronizing the pulses of neighboring pixels, as described below.

In a similar fashion, FIGS. 5A and 5B illustrate waveforms that may be used to effect the black-to-white (high positive to low negative) transition from FIG. 2E to FIG. 2F. The waveform or FIG. 5A is the standard waveform, while the waveform of FIG. 5B includes repeats of pulses t19 and t20, which are the reciprocal pulses of t17 and t18, discussed above. In the waveform of FIG. 5A, which is essentially an inverted version of the waveform of FIG. 4A, a high positive driving voltage ($V_{H1}$, for example +15V) is applied as a balance pulse for a period of t4. A shaking waveform is then applied, followed by application of the high positive driving voltage ($V_{H1}$) for a period of t5, thus ensuring that the pixel is in the black state shown in FIG. 2E. From this black state, the pixel is driven to the white state by applying a low negative driving voltage ($V_{L2}$, for example −3V) for a period of t6, to effect the black-to-white transition shown in from FIG. 2E to FIG. 2F. The period t5 is sufficient to drive the pixel to the black state when $V_{H1}$ is applied and the period t6 is sufficient to drive the pixel to the white state from the black state when $V_{L2}$ is applied. Similarly, FIG. 5B is essentially an inverted version of the waveform of FIG. 4B.

Figure 6A:
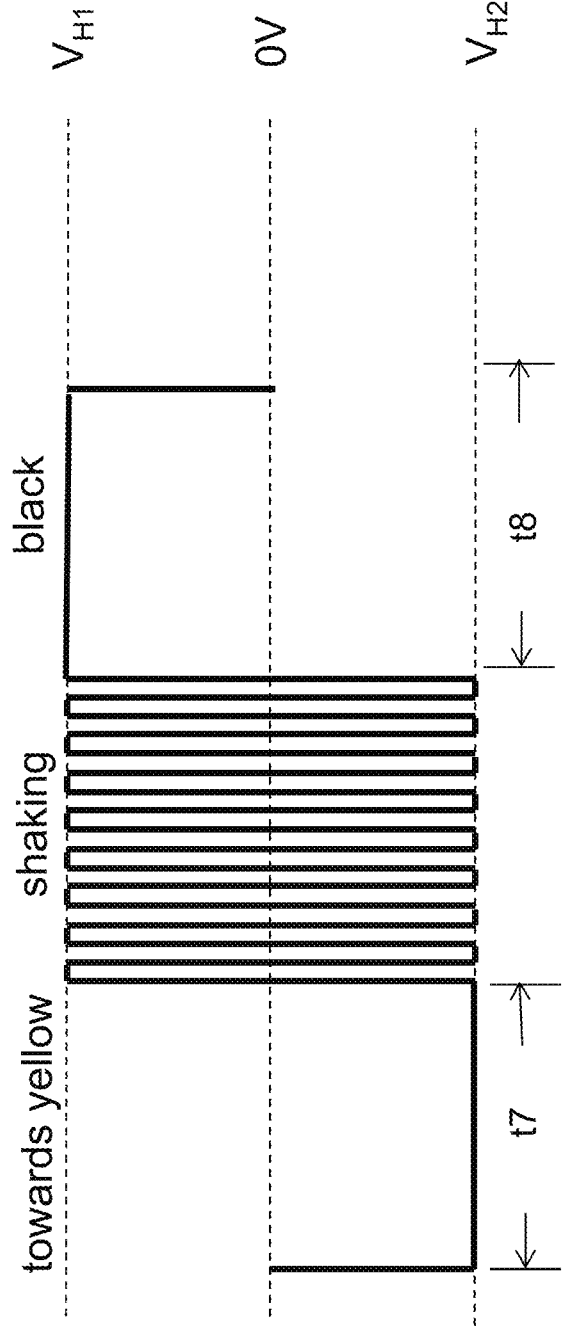
FIG. 6A illustrates a basic black driving waveform for a four particle electrophoretic display.
Figure 6B:
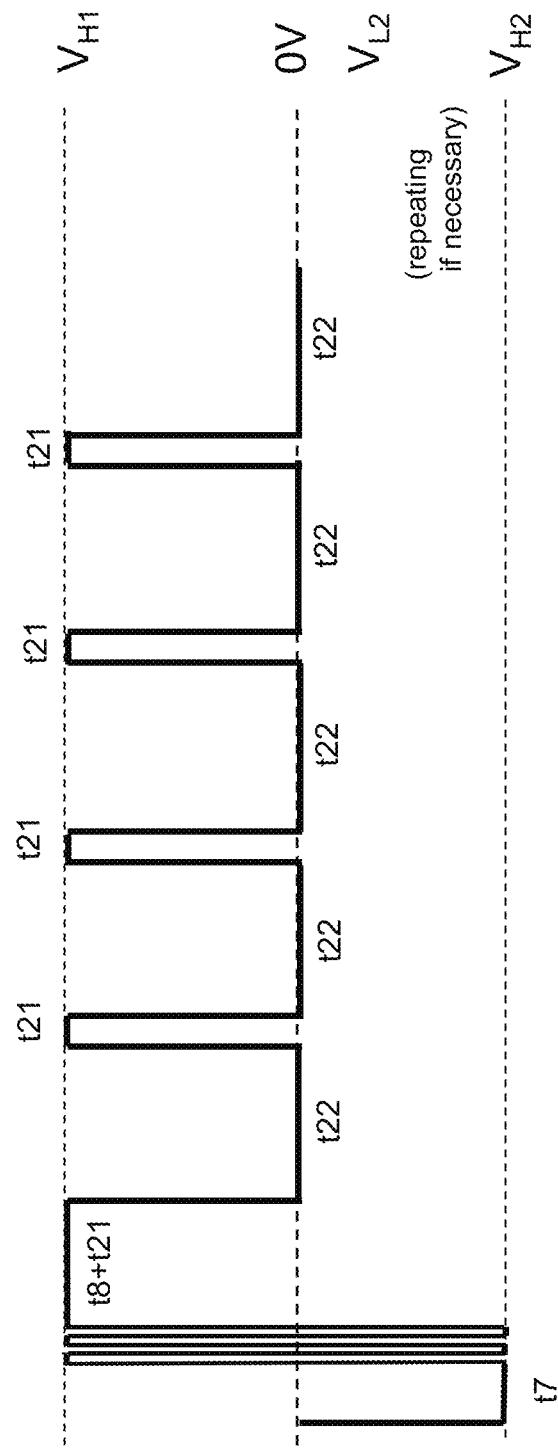
FIG. 6B illustrates a commercial implementation of a black waveform, which includes a string of repeating pulses. The repeating pulses improve the separation of the black particles from the other particles in the medium, resulting in a more saturated black optical state at the viewing surface.

FIG. 6A illustrates a standard waveform that may be used to effect the yellow to black (high negative to high positive) transition of FIGS. 2A to 2B. A balance pulse of width t7 and having the high negative voltage is delivered prior to a shaking waveform. The balance pulse achieves DC balance for the entire waveform and the shaking pulse is included to ensure color brightness and purity. Following the balance and shaking pulses, as shown in FIG. 6A, a high positive driving voltage ($V_{H1}$, e.g., +15V, +30V) is applied for a period t8 to drive a pixel towards a black state after the shaking waveform. The black repeat waveform, shown in FIG. 6B, is actually quite simple as compared to the repeat waveforms for red (FIG. 4B) and white (FIG. 5B). Essentially the repeat waveform begins with a balance pulse of width t7, a shaking pulse, and a succession of high positive driving pulses t21 to achieve a saturated black state at the desired pixels. Typically, pulse t21 has a pulse width of between 20-400 msec, while the no voltage "rest" or "wait" period t22 has a pulse width of >200 msec. The series of pulses is repeated for least 2 cycles (N>2), preferably at least 4 cycles and more preferably at least 8 cycles. The black color becomes more intense after each driving cycle. Importantly, the wait time t22 between successive high driving pulses is not crucial, and it can be adjusted ±40% to allow for synchronization of the black waveform with other colors, as discussed below.

FIGS. 7A and 7B illustrate a waveforms that may be used to effect the black to yellow (high positive to high negative) transition of FIGS. 2B to 2A. A balance pulse of width t9 and having the high negative voltage is delivered prior to a shaking waveform. The balance pulse achieves DC balance for the entire waveform and the shaking pulse is included to ensure color brightness and purity. Following the balance and shaking pulses, as shown in FIG. 7A, a high negative driving voltage ($V_{H2}$, e.g., −15V, −30V) is applied for a period t10 to drive a pixel towards a yellow state after the shaking waveform. FIG. 7B starts off similar to FIG. 7A, but finishes with successive high negative pulses of width t23, spaces apart by "wait" pulses of zero volts and having a pulse width of t24. The waveform of FIGS. 7A and 7B are essentially the inverse of the waveforms of FIGS. 6A and 6B and the pulse widths of the respective pulses are as described above with respect to FIGS. 6A and 6B.

Figure 8A:
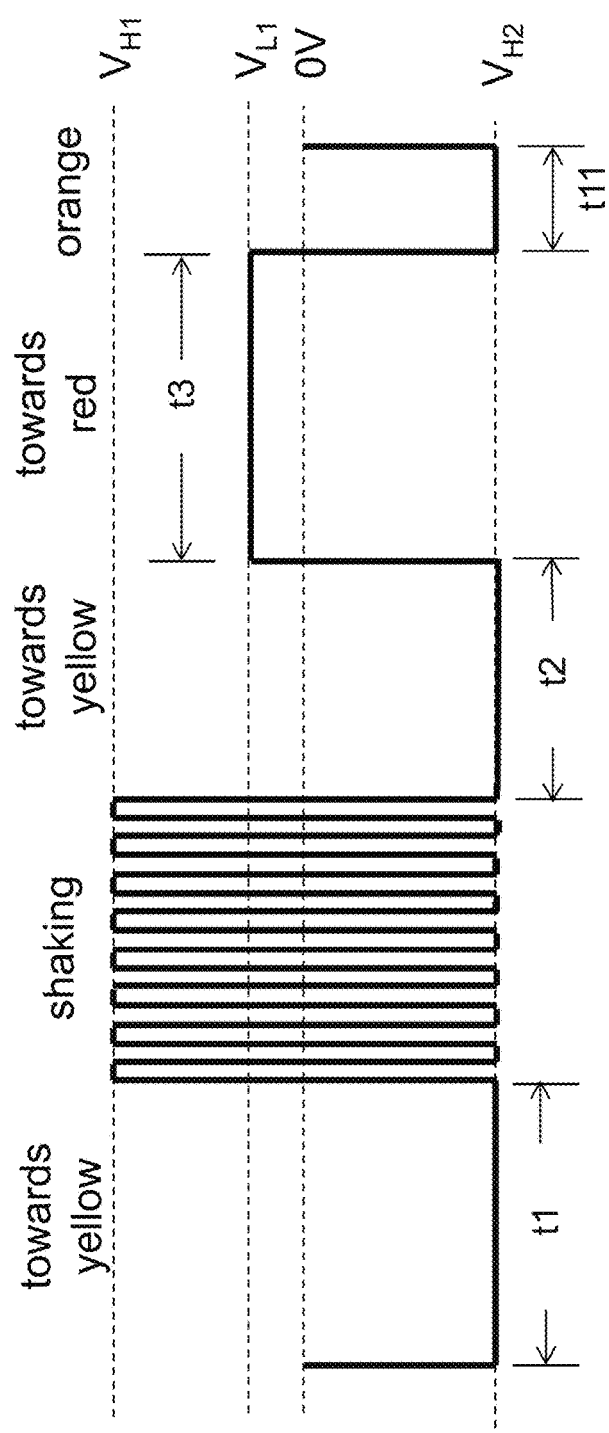
FIG. 8A illustrates a basic orange driving waveform for a four particle electrophoretic display.
Figure 8B:
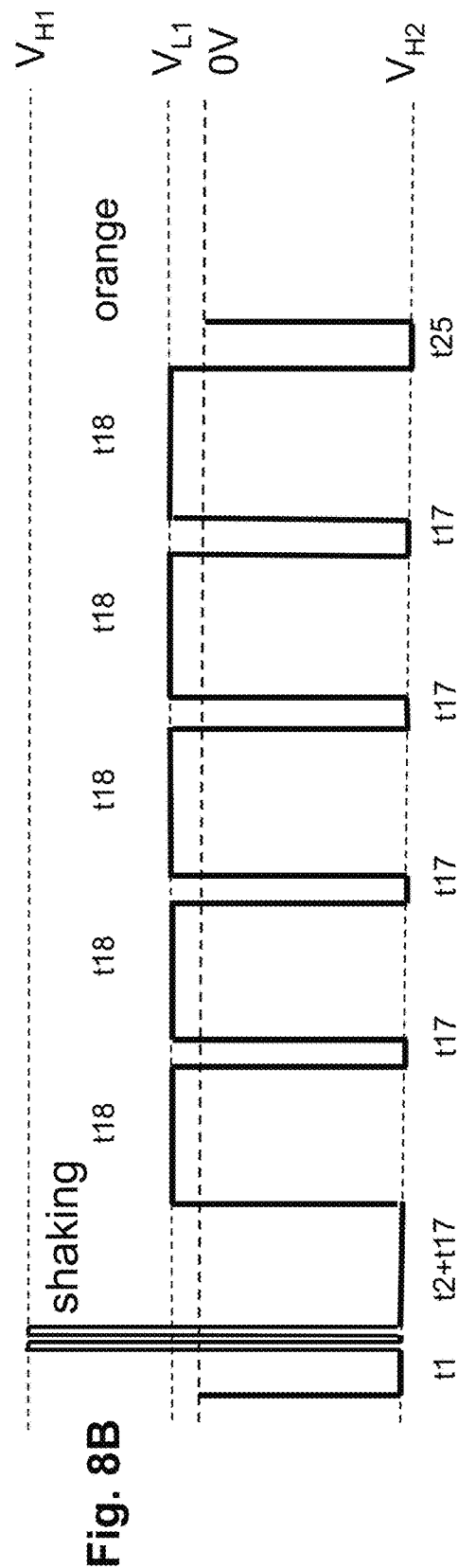
FIG. 8B illustrates a commercial implementation of an orange waveform, which includes a string of repeating pulses. The repeating pulses improve the separation of the red particles from the other particles in the medium, resulting in a more saturated orange optical state at the viewing surface.

FIGS. 8A and 8B illustrate waveforms to achieve an orange state from a red state as illustrated with the transition of FIG. 2G to 2H. For the most part, the waveforms of FIG. 8A and FIG. 8B are identical to the red waveforms of FIGS. 4A and 4B, with the exception of the last pulse, t11 in FIG. 8A and t25 in FIG. 8B, which is a truncated high negative pulse to drive some portion of the yellow particles toward the viewing surface so that the yellow particles mix with the red particles that are already present at the viewing surface. The last pulse of FIG. 8A, t11, is typically shorter in width than t2 or t3, but of equal magnitude and polarity (with respect to 0V) as t2. Typically, t11 is no longer than 50% of the width of t2. Similarly, the last pulse of FIG. 8B, t25, is shorter in pulse width than t18, but of equal magnitude and polarity (with respect to 0V) as t17. Typically t25 is no longer than about 50% of the pulse width of t18, however t25 is typically as long or longer than t17.

Figure 9A:
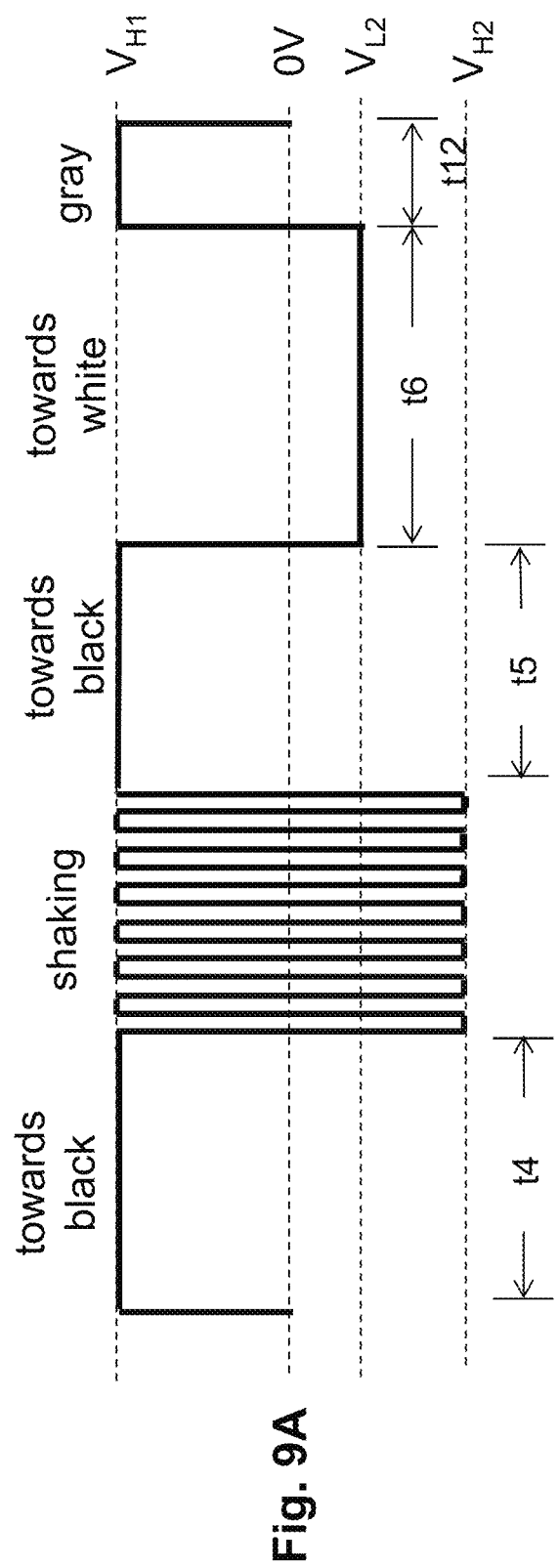
FIG. 9A illustrates a basic gray driving waveform for a four particle electrophoretic display.
Figure 9B:
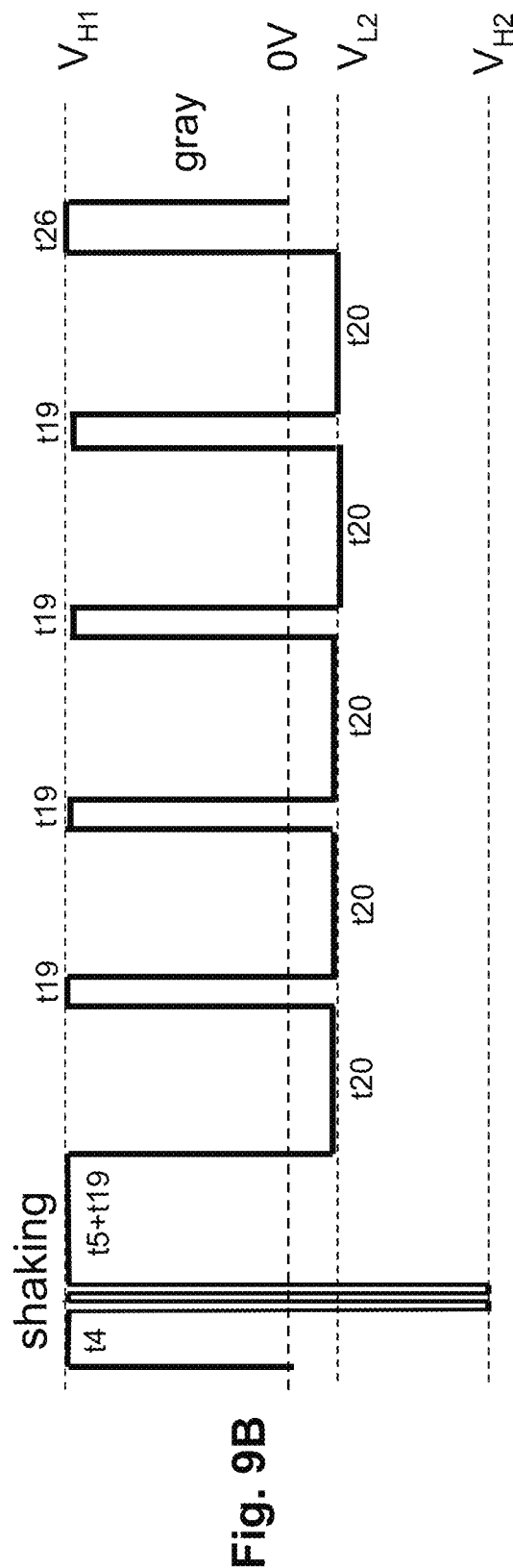
FIG. 9B illustrates a commercial implementation of a gray waveform, which includes a string of repeating pulses. The repeating pulses improve the separation of the white particles from the other particles in the medium, resulting in a more saturated gray optical state at the viewing surface.

FIGS. 9A and 9B illustrate waveforms to achieve a gray state from a white state as illustrated with the transition of FIGS. 2I to 2J. For the most part, the waveforms of FIG. 9A and FIG. 9B are identical to the white waveforms of FIGS. 5A and 5B, with the exception of the last pulse, t12 in FIG. 9A and t26 in FIG. 9B, which is a truncated high positive pulse to drive some portion of the black particles toward the viewing surface so that the black particles mix with the white particles that are already present at the viewing surface. The last pulse of FIG. 9A, t12, is typically shorter in width than t5 or t6, but of equal magnitude and polarity (with respect to 0V) as t5. Typically, t12 is no longer than 50% of the width of t5. Similarly, the last pulse of FIG. 9B, t26, is shorter in pulse width than t20, but of equal magnitude and polarity (with respect to 0V) as t19. Typically t26 is no longer than about 50% of the pulse width of t20, however t26 is typically as long or longer than t19.

The waveforms described thus far have been intended to display one of the six optical states shown in FIGS. 2A-2J, essentially the color of one of the four types of particles present in the display layer, or a mixture of one highly-charged particle and one lower-charged particle, where the particles have opposite polarity. It will be seen from the foregoing that while the embodiments of the invention previously described allow for the display of any one of six colors at each pixel, they do not provide an easy method for reproducibly controlling the gray level of each color or the degree of saturation thereof. Accordingly, if it is desired to use the present invention to provide gray scale color images, it will be necessary to dither (areally modulate) the pixels of the display to provide the necessary gray scale. For example, a desaturated red (pink) color could be displayed by setting alternating pixels of the display to red and white. Areal modulation in effect trades an increased number of gray levels for a reduction in display resolution (since the individual pixels are in effect used as sub-pixels of a larger pixel capable of gray level display), and the loss in resolution can be limited by increasing the number of reproducible color states (primaries) which can be displayed at each pixel.

Figure 10:
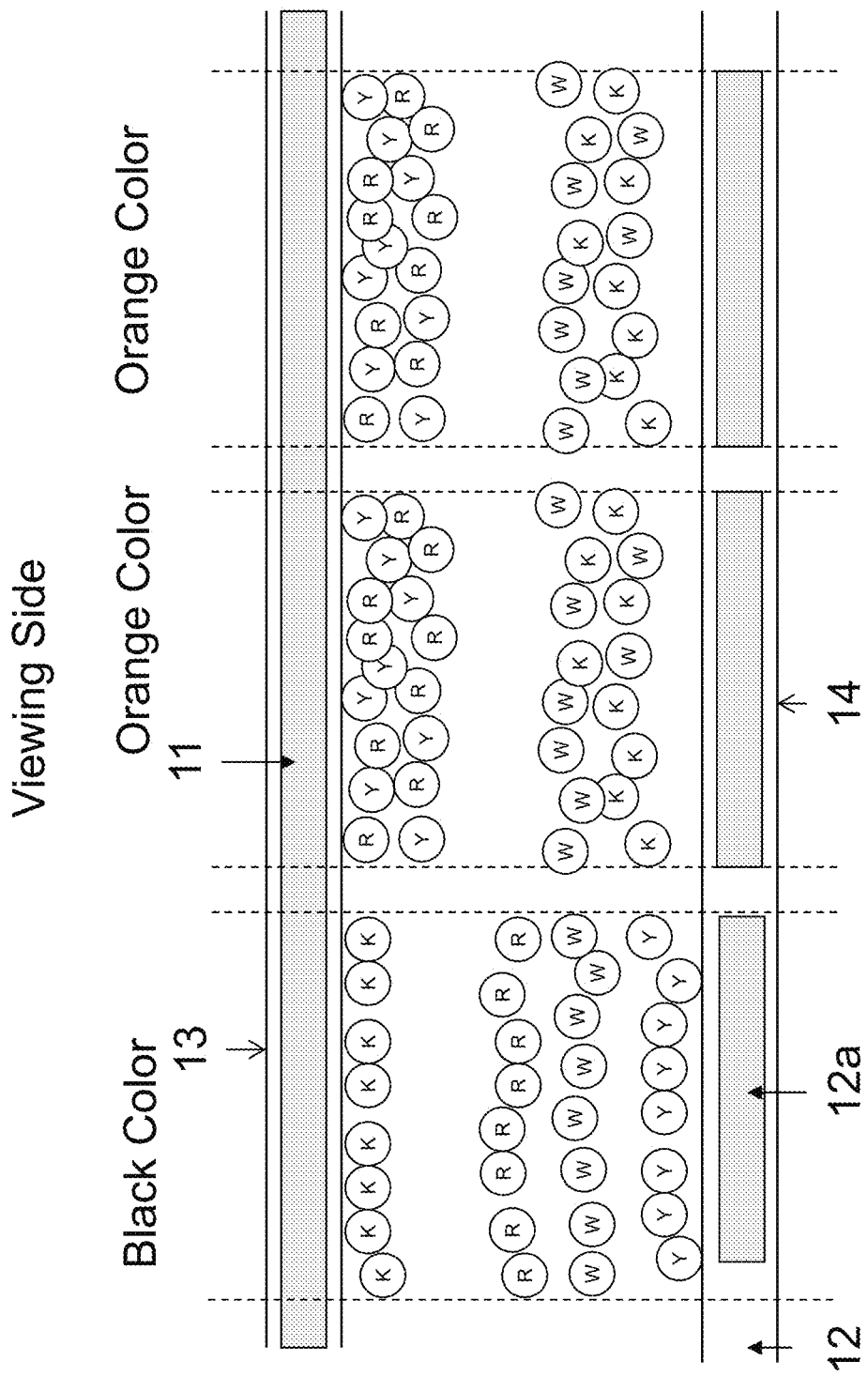
FIG. 10 illustrates an idealized arrangement of the colored electrophoretic particles when three successive pixels are addressed to black, orange, and orange.

As discussed previously, a primary application of a four particle electrophoretic medium is for use in digital signage, such as an electronic shelf label, where pixelated images are used to convey information to a viewer, such as price, quantity, origin, or special feature, such as "gluten free." Returning to the cross section of the system of FIG. 1, it is evident that when presenting text, images, etc., there will be boundaries where one pixel is a first color and an adjacent pixel is a different color. This concept is illustrated in FIG. 10, where a first pixel is nominally a black color, driven with a waveform of FIG. 6B, and a second and third pixel are nominally orange, driven with a waveform of FIG. 8B. Accordingly, each successive pixel has an ordered particle set as described above, e.g., with respect to FIGS. 2B and 2H.

Figure 11:
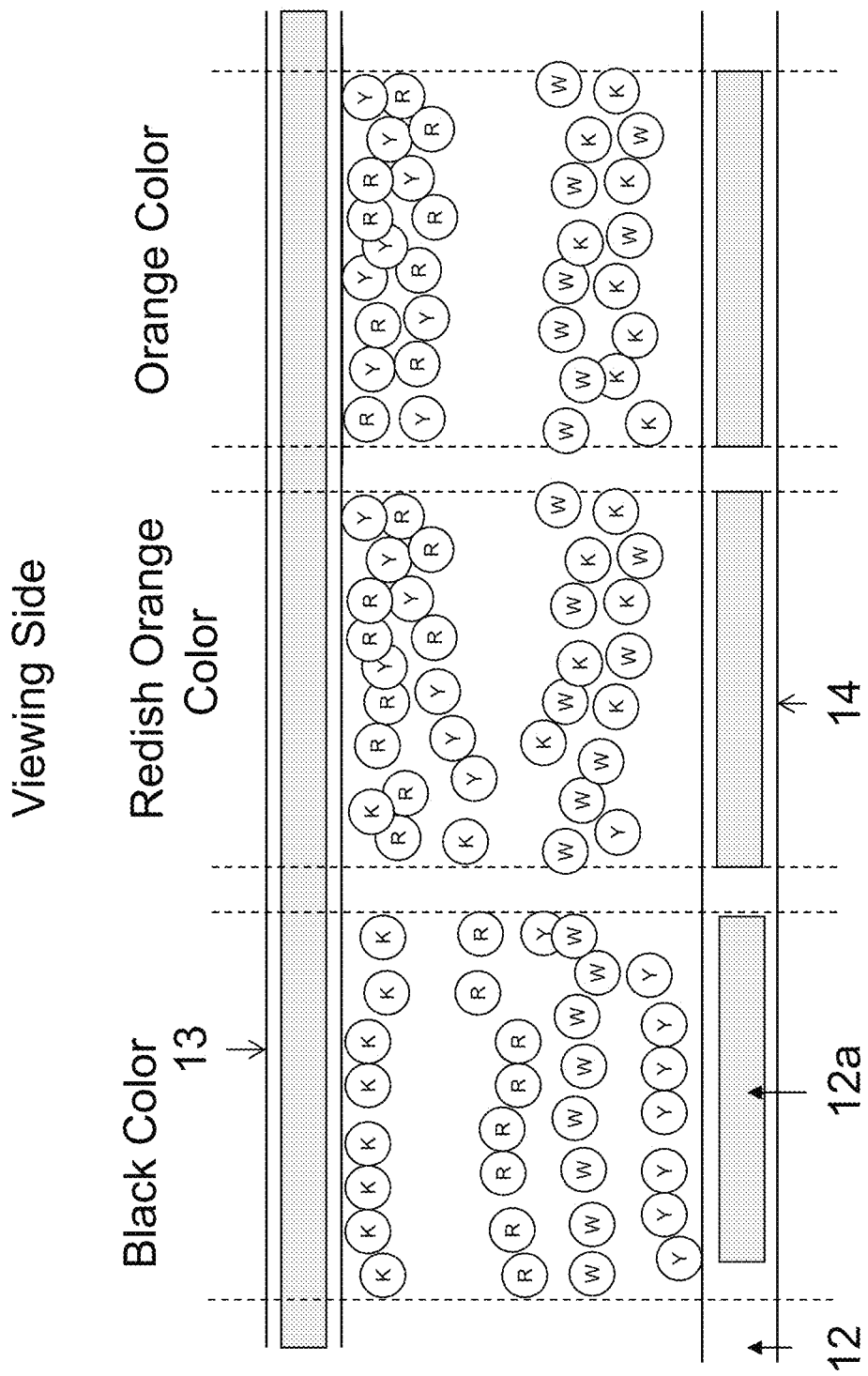
FIG. 11 illustrates (more realistically) the effect that neighboring pixel electric charges have on the final optical state when three successive pixels are addressed to black, orange, and orange.

Unfortunately, in reality, the electrophoretic medium experiences electric fields not only from the pixel electrode directly below the electrophoretic medium, but also from the neighboring pixel electrodes. The field lines from adjacent pixels, in some instances, are sufficient to causing a misalignment of the particles, which in a multi-particle electrophoretic medium results in a color change. This feature is known as "blooming" in the field of electrophoretic displays, and the problem is illustrated in FIG. 11, where the left most pixel has a slight amount of black pigment that has pulled back from the viewing surface, while the middle pixel actually achieves an entirely different color as the yellow particles are deflected in the opposite direction from their intended location due to the electric fields from the high negative charge state in the next-door pixel. Because of human eye is very sensitive to certain colors, blooming in color displays can be debilitating. For example, between the wavelengths of 540 nm (green) to 580 nm (orange), there are a huge number of independently identifiable colors (amber, lemon, goldenrod, mustard, chartreuse, lime) and small shifts in color in this region are particularly eye-catching. Historically, blooming in electrophoretic displays has been diminished by adding insulating structures between the electrodes (see U.S. Pat. No. 7,388,572), or by using specialty layers that restrict the directional field lines emanating from a given pixel to mostly up-and-down, as opposed to the sides. See e.g., U.S. Pat. Nos. 7,110,163 and 10,613,407.

In four particle electrophoretic media of the type described above, the blooming is most evident in the situation illustrated in FIG. 11, i.e., wherein there is a mixed-state pixel adjacent a pixel having the optical state of the high-charge particle that is not present in the mixed state. For the set of colors discussed above, this occurs when a black pixel is next to an orange pixel, or when a yellow pixel is next to a gray pixel. In these instances, the mixed state is very susceptible to the pull from an adjacent pixel electrode. Thus, orange states go to red, and gray states look yellow.

Figure 12:
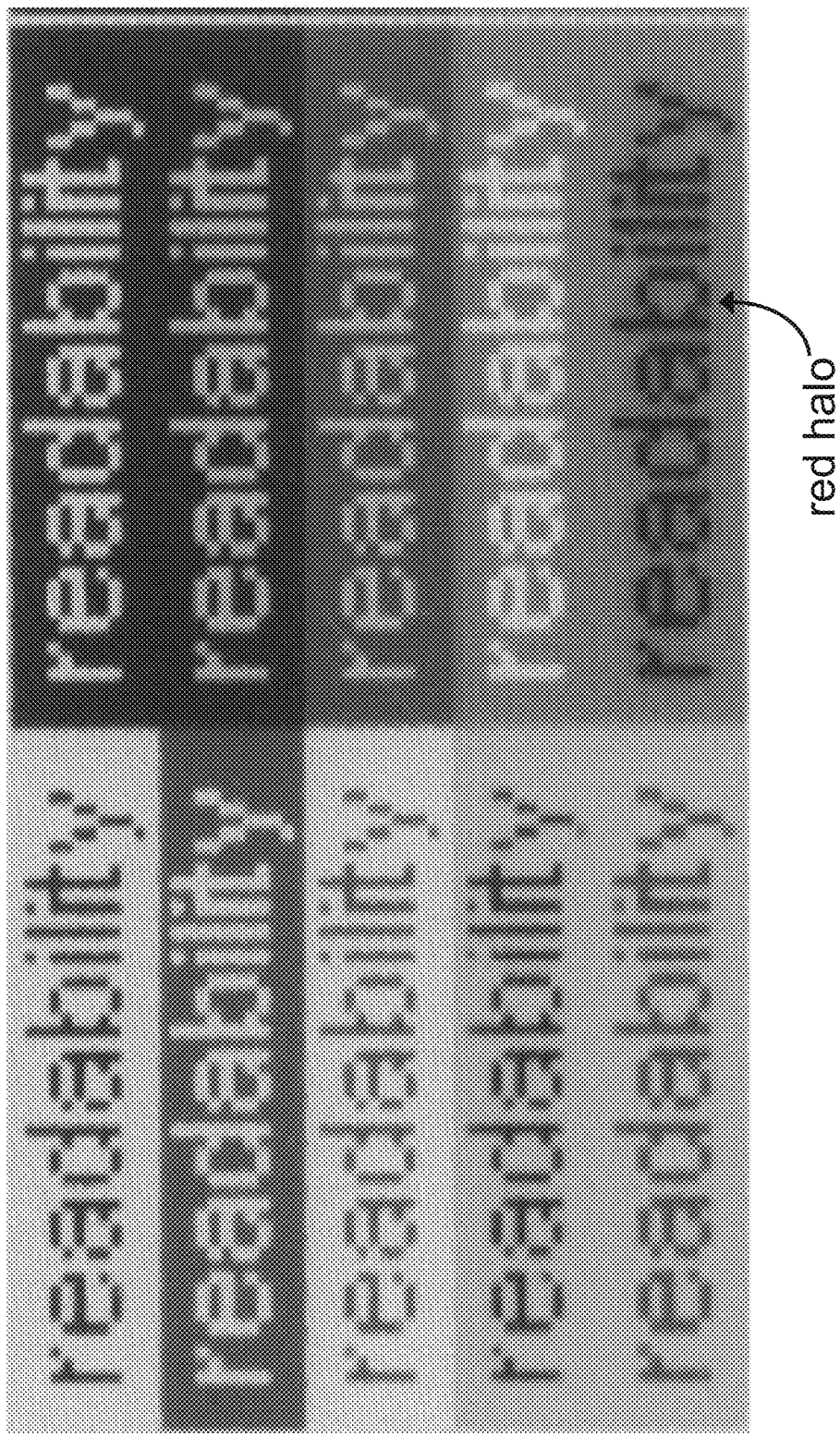
FIG. 12 shows a photograph of a test pattern in a black, white, red, yellow electrophoretic display of the invention when the driving waveforms are not coordinated in neighboring pixels.

A photograph of an active matrix test panel showing a series of color combinations is shown in FIG. 12. Looking at the bottom right banner of "readability," one can see a noticeable red halo around the black lettering due to blooming of the type illustrated in FIG. 11. Additionally, the text across the panel is not as clean as would be expected with, e.g., a top-of-the-line black and white electrophoretic display. In particular the curved portions of "a", "e", "d", and "b" on the left hand side of the panel have breaks where the pixels did not address correctly. (Compare to FIG. 15, below.) In many instances, the loss in fidelity of the text will still be sufficient for digital signage, such as supermarket shelf labels. However, the color changes are typically more noticeable, especially in the oranges, yellows, and greens.

Figure 13:
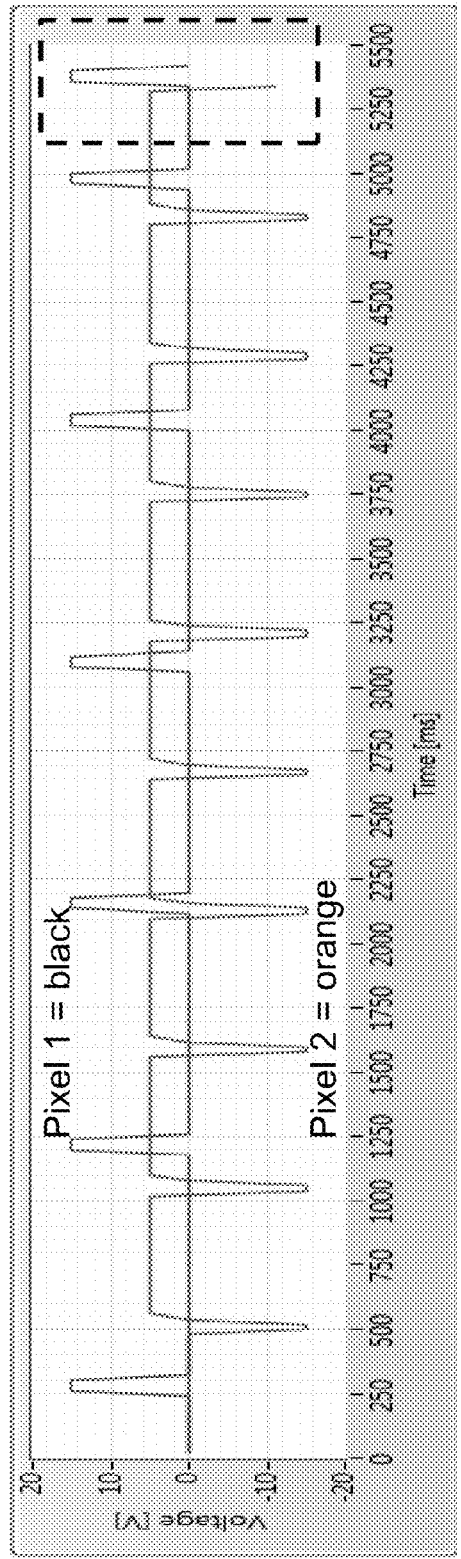
FIG. 13 shows exemplary black and orange waveforms from adjacent pixels wherein the electric field pulses are not synchronized and the black waveform is not truncated.

Looking more closely at the driving waveforms of adjacent pixels, the addressing pulses are typically delivered as shown in FIG. 13, where pixel 1 is being addressed for black and pixel 2 is being addressed for orange, i.e., as discussed above with respect to FIGS. 6B and 8B. A typical electrophoretic display driver has a database of color waveforms to deliver to individual pixels through some pre-determined number of frames. In the course of updating the image, the frames of neighboring pixels are typically not coordinated and there a times with the high voltage pulses overlap and there are times when the high voltage pulses are staggered from each other. Perhaps more importantly, there are also times when a lower voltage addressing pulse of one polarity, e.g., to achieve a red optical state at the viewing surface, overlaps with a higher voltage addressing pulse of the same polarity. As a result, the impulse (time×voltage) experienced by lower-charge particles that neighbor pixels displaying different final optical state will be far from optimum. Additionally, in the instance of FIG. 13, it is also possible that the last high voltage addressing for the highly charged particle comes after the orange waveform has finished (see dashed box).

Figure 14:
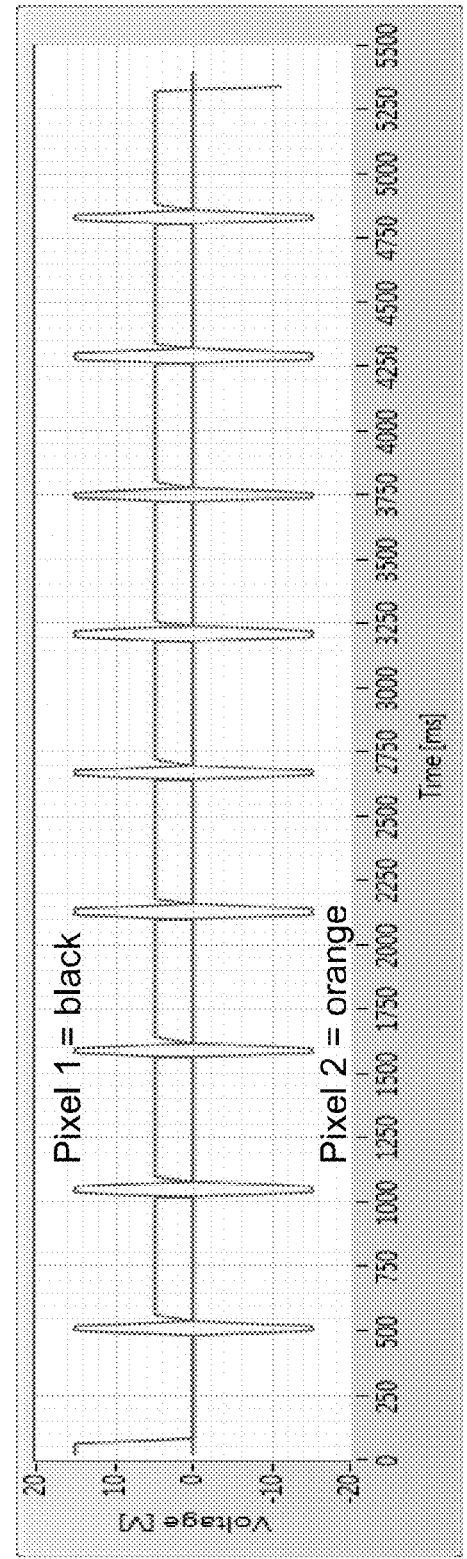
FIG. 14 shows exemplary black and orange waveforms from adjacent pixels wherein the electric field pulses are synchronized and the black waveform is truncated so that it does not interfere with the last pulse of the orange waveform.
Figure 15:
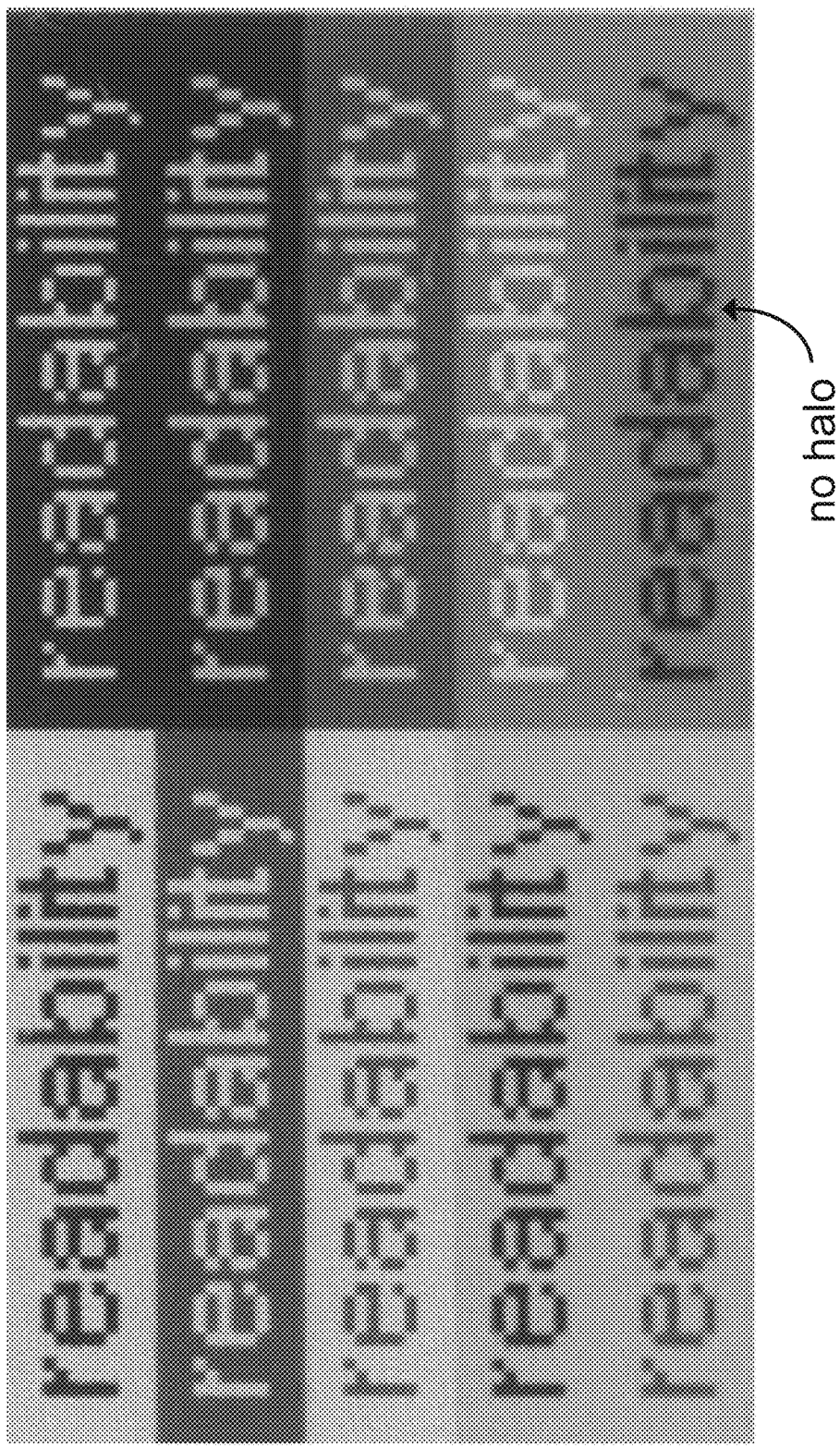
FIG. 15 shows a photograph of a test pattern in a black, white, red, yellow electrophoretic display of the invention when the driving waveforms are coordinated in neighboring pixels, as shown in FIG. 14.

It has been discovered that trimming adjacent higher-charge state particle waveforms and synchronizing the high-voltage pulses to arrive at approximately the same frame, alone, can greatly reduce the effects of blooming with respect to color change. While not obligatory, it also beneficial when the high-voltage pulses of a first polarity do not overlap substantially with the low-voltage pulses of the same polarity. Such a modified set of waveforms for adjacent pixels is shown in FIG. 14. When the identical test panel of FIG. 12 is addressed with coordinated waveforms, as shown in FIG. 15, the red halo around "readability" in the lower right of the test panel disappears, and the text is generally easier to read, as evidenced by FIG. 15.

Accordingly, the invention provides an improved method for driving adjacent pixels in an electrophoretic display having four types of colored particles. In particular, by coordinating the high voltage pulses to arrive at approximately the same frame, the color change due to blooming is substantially reduced. Additionally, by trimming the high voltage pulses used to address the highly-charged particle states, there is less color drift in the mixed state pixels and improved color fidelity.

While the present invention has been described with reference to the specific embodiments thereof, it should be understood by those skilled in the art that various changes may be made and equivalents may be substituted without departing from the scope of the invention. In addition, many modifications may be made to adapt a particular situation, materials, compositions, processes, process step or steps, to the objective and scope of the present invention. All such modifications are intended to be within the scope of the claims appended hereto.

The invention claimed is:

1. A method of driving a display layer disposed between a viewing surface including a light-transmissive electrode and a second surface on the opposed side of the display layer from the viewing surface, the second surface including a first driving electrode and a second driving electrode, the display layer including an electrophoretic medium comprising a fluid and first, second, third and fourth types of particles dispersed in the fluid, wherein the first, second, third and fourth types of particles have respectively first, second, third, and fourth optical characteristics differing from one another, the first and third types of particles having charges of a first polarity and the second and fourth types of particles having charges of a second polarity, opposite the first polarity, and the first and third types of particles do not have the same charge magnitudes, and the second and fourth types of particles do not have the same charge magnitudes, the method comprising the following steps:
(i) applying a first electric field having a high magnitude and the first polarity to the first drive electrode for a first time period to drive the first type of particles towards the viewing surface, thereby causing the display layer to display the first optical characteristic at the viewing surface above the first drive electrode;
(ii) applying a second electric field having the high magnitude and the second polarity to the second drive electrode for a second time period to drive the second type of particles toward the viewing surface, thereby causing the display layer to display the second optical characteristic at the viewing surface above the second drive electrode, wherein the first electric field is applied to the first drive electrode simultaneously while the second electric field is applied to the second drive electrode;
(iii) applying no electric field to the first drive electrode for a third period following the first period;
(iv) applying a third electric field having a low magnitude and the first polarity to the second drive electrode for a fourth time period overlapping with the third time period to drive the third type of particles toward the viewing surface, thereby causing the display layer to display the third optical characteristic at the viewing surface above the second drive electrode;
(v) repeating steps (i)-(iv); and
(vi) applying a fourth electric field having the same magnitude and polarity as step (ii) to the second drive electrode for a fifth time period, thereby causing the display layer to display a mixture of the second and third optical characteristics at the viewing surface above the second drive electrode while displaying the first optical characteristic at the viewing surface above the first drive electrode.

2. The method of claim 1, wherein the first time period is shorter than the third time period.

3. The method of claim 2, wherein the second time period is shorter than the fourth time period.

4. The method of claim 3, wherein the fifth time period is longer than the first time period and shorter than the third time period.

5. The method of claim 1, wherein the magnitude of the third electric field is less than 50 percent of the magnitude of the second electric field.

6. The method of claim 1 wherein the first time period and the fourth time period do not overlap in time.

7. The method of claim 1, wherein the first and third types of particles are negatively charged and the second and fourth types of particles are positively charged.

8. The method of claim 7, wherein the first type of particle is yellow, the second type of particle is black, the third type of particle is white, and the fourth type of particle is red.

9. The method of claim 1, wherein the first type of particle is light transmissive, the second type of particle is yellow, the fourth type of particle is white, and the first and third types of particles are red and blue (in either order).

* * * * *